(12) United States Patent
Senga

(10) Patent No.: US 12,520,159 B2
(45) Date of Patent: Jan. 6, 2026

(54) WIRELESS COMMUNICATION DEVICE, WIRELESS COMMUNICATION METHOD, AND NON-TRANSITORY COMPUTER READABLE MEDIUM

(71) Applicant: Mitsubishi Electric Corporation, Tokyo (JP)

(72) Inventor: Kohei Senga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 386 days.

(21) Appl. No.: 18/221,069

(22) Filed: Jul. 12, 2023

(65) Prior Publication Data
US 2023/0354038 A1 Nov. 2, 2023

Related U.S. Application Data

(63) Continuation of application No. PCT/JP2021/009571, filed on Mar. 10, 2021.

(51) Int. Cl.
*H04W 12/64* (2021.01)
*H04W 64/00* (2009.01)

(52) U.S. Cl.
CPC ......... *H04W 12/64* (2021.01); *H04W 64/003* (2013.01)

(58) Field of Classification Search
CPC . H04W 12/64; H04W 64/003; H04W 64/006; H04W 12/63
USPC .......................................................... 455/411
See application file for complete search history.

(56) References Cited

U.S. PATENT DOCUMENTS

| 12,099,558 B2 * | 9/2024 | Zheng ................. G06F 16/9535 |
| 12,231,932 B2 * | 2/2025 | Kuriki .................... H04W 4/021 |
| 2006/0045200 A1 * | 3/2006 | Bocquet ............ H04L 25/03292 375/267 |

(Continued)

FOREIGN PATENT DOCUMENTS

| CN | 101604312 A | * 12/2009 | |
| CN | 103081546 A | * 5/2013 | ........... G01S 5/0009 |

(Continued)

OTHER PUBLICATIONS

Akhlaghpasand et al., "Jamming Suppression in Massive MIMO Systems," IEEE Transactions on Circuits and Systems—II: Express Briefs, vol. 67, No. 1, Jan. 2020, pp. 182-186.

(Continued)

*Primary Examiner* — Mahendra R Patel
(74) *Attorney, Agent, or Firm* — BIRCH, STEWART, KOLASCH & BIRCH, LLP

(57) ABSTRACT

A wireless communication device includes: a position information database (207) in which map information is stored; a radio wave information acquisition unit (203) to extract a physical quantity of a communication radio wave received from a communication partner device; a position identification unit (210) to identify a position of the communication partner device on a basis of the physical quantity acquired by the radio wave information acquisition unit; and a determination unit (208) to collate the position of the communication partner device which is identified by the position identification unit, with the map information stored in the position information database, and to determine whether the communication partner device is an authorized device or an unauthorized device.

12 Claims, 15 Drawing Sheets

(56) References Cited

U.S. PATENT DOCUMENTS

| | | | |
|---|---|---|---|
| 2006/0276201 A1* | 12/2006 | Dupray | H04W 4/029 |
| | | | 455/456.1 |
| 2009/0276585 A1 | 11/2009 | Wada | |
| 2010/0079599 A1* | 4/2010 | Kanma | H04N 1/32117 |
| | | | 348/207.1 |
| 2010/0135203 A1 | 6/2010 | Maru | |
| 2011/0134848 A1 | 6/2011 | Tamaki | |
| 2014/0023158 A1 | 1/2014 | Maru | |
| 2014/0341061 A1* | 11/2014 | Shinada | H04W 40/12 |
| | | | 370/252 |
| 2015/0222632 A1 | 8/2015 | Ichijo et al. | |
| 2016/0146922 A1* | 5/2016 | Moshfeghi | H04W 64/00 |
| | | | 455/456.6 |
| 2016/0277084 A1 | 9/2016 | Maru | |
| 2020/0204238 A1 | 6/2020 | Na et al. | |
| 2020/0382981 A1* | 12/2020 | Kachemir | H04W 24/02 |
| 2021/0019425 A1* | 1/2021 | Ostadzadeh | H04W 12/00 |
| 2021/0072341 A1* | 3/2021 | Bocca | H04B 17/318 |
| 2021/0124059 A1 | 4/2021 | Kowada et al. | |
| 2021/0149016 A1* | 5/2021 | Murakami | H04W 72/04 |
| 2021/0250894 A1* | 8/2021 | Ohtsuji | G06F 17/141 |
| 2021/0352512 A1 | 11/2021 | Kachemir et al. | |

FOREIGN PATENT DOCUMENTS

| | | | | |
|---|---|---|---|---|
| EP | 1860863 A1 | 11/2007 | | |
| EP | 2169938 A2 | 3/2010 | | |
| EP | 2822312 A1 | 1/2015 | | |
| EP | 3361800 A1 | 8/2018 | | |
| EP | 3809162 A1 | 4/2021 | | |
| JP | 8-15403 A | 1/1996 | | |
| JP | 2001059740 A * | 3/2001 | | |
| JP | 2003-284123 A | 10/2003 | | |
| JP | 2004-153738 A | 5/2004 | | |
| JP | 2005-204232 A | 7/2005 | | |
| JP | 2006-67070 A | 3/2006 | | |
| JP | 2006-293976 A | 10/2006 | | |
| JP | 2007-155523 A | 6/2007 | | |
| JP | 2008-66805 A | 3/2008 | | |
| JP | 2010-87829 A | 4/2010 | | |
| JP | 2010-199753 A | 9/2010 | | |
| JP | 2011-158430 A | 8/2011 | | |
| JP | 2013-31045 A | 2/2013 | | |
| JP | 2013-93879 A | 5/2013 | | |
| JP | 2015-146175 A | 8/2015 | | |
| JP | 2016-103848 A | 6/2016 | | |
| JP | 2016-131299 A | 7/2016 | | |
| JP | 2016-220013 A | 12/2016 | | |
| JP | 2018-535567 A | 11/2018 | | |
| JP | 2019-518202 A | 6/2019 | | |
| JP | 2019-129434 A | 8/2019 | | |
| JP | 2020-144115 A | 9/2020 | | |
| WO | WO 2006/115048 A1 | 11/2006 | | |
| WO | WO 2009/017230 A1 | 2/2009 | | |
| WO | WO-2012042851 A1 * | 4/2012 | | G01S 5/0249 |
| WO | WO 2013/128613 A1 | 9/2013 | | |
| WO | WO-2019239764 A1 * | 12/2019 | | G01S 19/22 |
| WO | WO-2020202828 A1 * | 10/2020 | | H04W 72/541 |

OTHER PUBLICATIONS

Akhlaghpasand et al., "Jamming-Robust Uplink Transmission for Spatially Correlated Massive MIMO Systems," IEEE Transactions on Communications, vol. 68, No. 6, Jun. 2020, pp. 3495-3504.

Do et al., "Jamming-Resistant Receivers for the Massive MIMO Uplink," IEEE Transactions on Information Forensics and Security, vol. 13, No. 1, Jan. 2018, pp. 210-223.

International Search Report for International Application No. PCT/JP2022/018050, dated Jul. 19, 2022.

Nguyen et al., "A Real-Time and Protocol-Aware Reactive Jamming Framework Built on Software-Defined Radios," ACM SRIF 2014, pp. 15-22.

German Office Action for German Application No. 11 2022 006 668.7, dated Apr. 28, 2025, with English translation.

Zhang et al., "An Efficient Algorithm Based on Interference Cancellation Against Reactive Jammer," 24th Asia-Pacific Conference on Communications, 2018, pp. 229-232.

International Search Report, issued in PCT/JP2021/009571, PCT/ISA/210, dated Jun. 15, 2021.

Jiang et al., "PHYAlert: identity spoofing attack detection and prevention for a wireless edge network", Journal of Cloud Computing, 2020, vol. 9, No. 5, Published: Jan. 28, 2020, total 13 pages.

Lu et al., "LaSa: Location Aware Wireless Security Access Control for IoT Systems", Mobile Networks and Applications, 2019, vol. 24, p. 748-760.

Vasisht et al., "Decimeter-Level Localization with a Single WiFi Access Point", USENIX NSDI 2016, 13th USENIX Symposium on Networked Systems Design and Implementation, Mar. 16-18, 2016, p. 165-178.

* cited by examiner

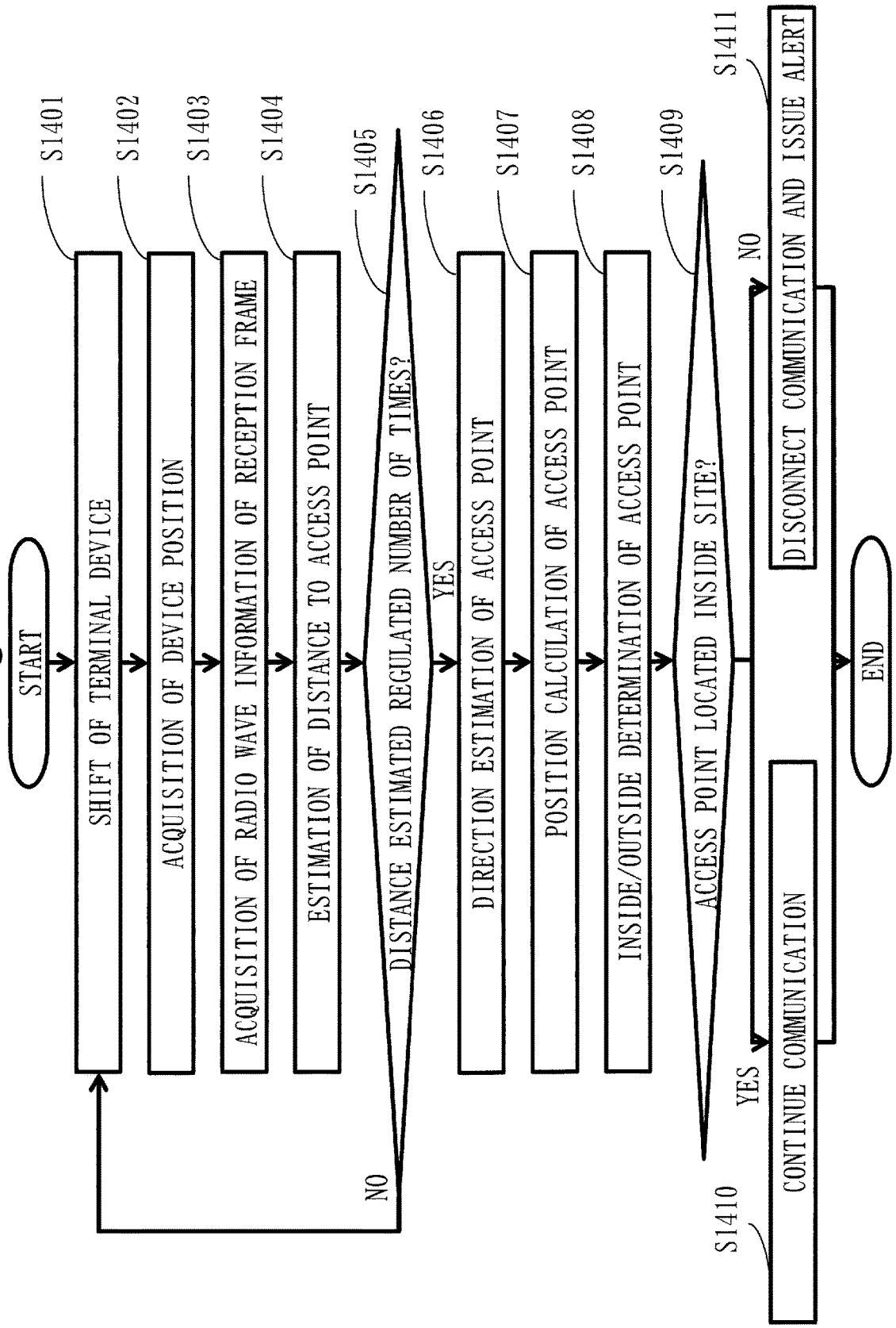

WIRELESS COMMUNICATION DEVICE, WIRELESS COMMUNICATION METHOD, AND NON-TRANSITORY COMPUTER READABLE MEDIUM

CROSS REFERENCE TO RELATED APPLICATIONS

This application is a Continuation of PCT International Application No. PCT/JP2021/009571 filed on Mar. 10, 2021, which is hereby expressly incorporated by reference into the present application.

TECHNICAL FIELD

The present disclosure relates to a wireless communication device, a wireless communication method, and a program.

BACKGROUND ART

In a wireless network, access control is more important than in a wired network because many unidentified terminal devices can access the network from a remote spot as long as radio waves reach. In particular, if an unauthorized terminal device spoofs an authorized device by disguising information such as the media access control address (MAC address), or if an authorized terminal device is stolen, an unauthorized terminal device outside an area may be able to intrude into the wireless network inside the area. Therefore, in a specific area such as a site of a facility, it is desirable to regard only terminal devices that are actually inside the area as authorized and to permit only terminal devices inside the area to access the network.

In access control in conventional wireless networks, a position detection sensor is placed independently of an access point or a terminal device, and a position of the terminal device is estimated from a measurement result of the position detection sensor. Thus, access to the access point is permitted only to a terminal device that is determined to be located inside a service area (Patent Literature 1).

CITATION LIST

Patent Literature

Patent Literature 1: JP 2005-204232 A

Non-Patent Literature

Non-Patent Literature 1: D. Vasisht et al. "Decimeter-Level Localization with a Single WiFi Access Point", USENIX NSDI 2016, 13th USENIX Symposium on Networked Systems Design and Implementation (NSDI '16). Mar. 16-18, 2016•Santa Clara, CA, USA ISBN 978-1-931971-29-4 pp 165-178 https://www.usenix.org/system/files/conference/nsdi16/nsdi16-paper-vasisht.pdf

SUMMARY OF INVENTION

Technical Problem

In Patent Literature 1, an access point permits or denies access from a terminal device. Therefore, Patent Literature 1 has a problem of inability to detect an attack by an unauthorized access point spoofing an authorized access point trying to steal information transmitted by the authorized terminal device. Moreover, Patent Literature 1 has a problem that if an authorized terminal device is hijacked, an attack of intruding into a wireless network cannot be detected.

Further, in Patent Literature 1, a position detection sensor is installed independently of an access point or a terminal device. Therefore, in Patent Literature 1, an attack on an authorized terminal device cannot be detected when a high-directivity radio wave is irradiated from a remote location only to the authorized terminal device by utilizing: a high-directivity antenna such as an array antenna; a method of irradiating a carrier wave and a modulated wave separately so that they overlap only near an object; or a beam forming technique incorporated in Wi-Fi.

The present disclosure provides a wireless communication device capable of access control by determining whether a communication partner device is an authorized device or an unauthorized device.

Solution to Problem

A wireless communication device of the present disclosure includes:
a position information database in which map information is stored;
a radio wave information acquisition unit to extract a physical quantity of a communication radio wave received from a communication partner device;
a position identification unit to identify a position of the communication partner device on a basis of the physical quantity acquired by the radio wave information acquisition unit; and
a determination unit to collate the position of the communication partner device which is identified by the position identification unit, with the map information stored in the position information database, and to determine whether the communication partner device is an authorized device or an unauthorized device.

Advantageous Effects of Invention

According to the present disclosure, a position identification unit identifies a position of a communication partner device from a physical quantity of communication radio wave, and a determination unit collates the identified position of the communication partner device with map information. Thus, whether the communication partner device is an authorized device or an unauthorized device can be determined.

BRIEF DESCRIPTION OF DRAWINGS

FIG. 15 is an operation flowchart of the terminal device 100 in Embodiment 3.

DESCRIPTION OF EMBODIMENTS

In description and drawings of embodiments below, the same reference sign denote the same portions or equivalent portions.

Figure 1:
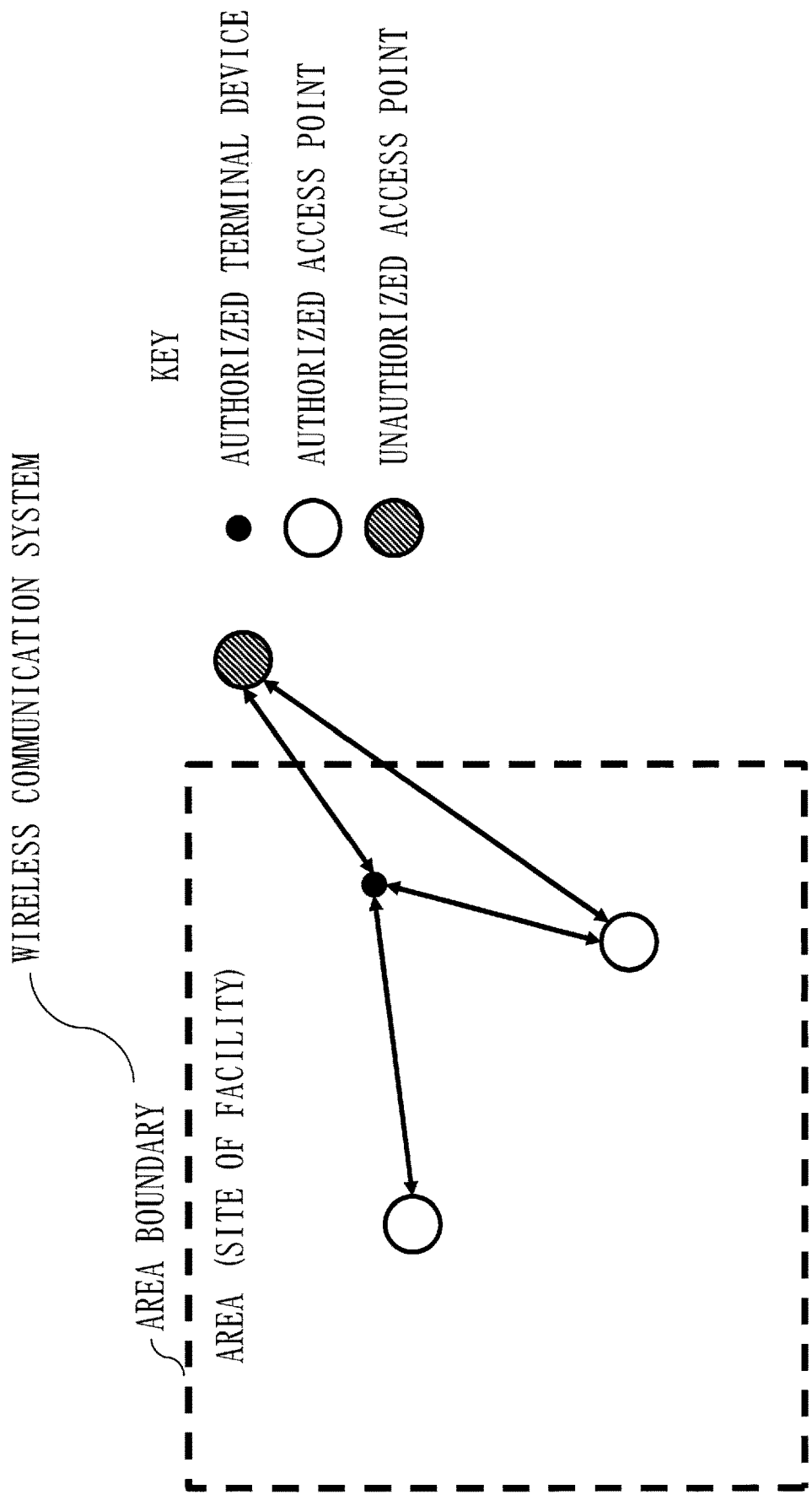
FIG. 1 is a diagram illustrating a wireless communication system in Embodiment 1.

An embodiment will be described assuming a wireless communication system of FIG. 1. Following is description of the wireless communication system of FIG. 1.

A terminal device is an example of a wireless communication device. A specific example of the terminal device is a smartphone or a tablet personal computer (PC).

An access point is equipment or a device that accepts, at a network edge, a connection demand from a terminal device and mediates communication to the network. The access point is a communication device that can communicate with the terminal device, and is an example of a communication partner device. The access point is also called an access point device.

An area is partitioned off by an area boundary into an inside and an outside. The area is a place where an authorized terminal device and an authorized access point should exist. A specific example of the area is a site of a facility.

The authorized terminal device and the authorized access point are located inside the area.

An unauthorized access point is located outside the area.

The unauthorized access point can acquire a media access control address (MAC address) and a service set identifier (SSID) of the authorized access point by eavesdropping communication between the authorized terminal device and the authorized access point. Further, the unauthorized access point can spoof an authorized access point by disguising itself with the acquired MAC address and the acquired SSID.

Embodiment 1

Embodiment 1 is premised on the following.

The terminal device is fixed at a particular spot inside the area.

There is no obstacle in the area that interferes with radio waves.

An unauthorized access point installed by an attacker spoofs an access point by disguising the SSID but does not disguise the MAC address.

The terminal device is provided with a plurality of antennas and conforms with multi-input multi-output (MIMO) communication.

In Embodiment 1, the following access control will be described.

The access control to be described is as follows. A terminal device located inside the area estimates a position of an access point by itself and determines whether the position of the access point is located inside the area. If the access point is located inside the area, the terminal device continues communication. If the access point is located outside the area, the terminal device indicates an alert reporting the position of the access point to a user and disconnects communication.

DESCRIPTION OF CONFIGURATION

Figure 2:
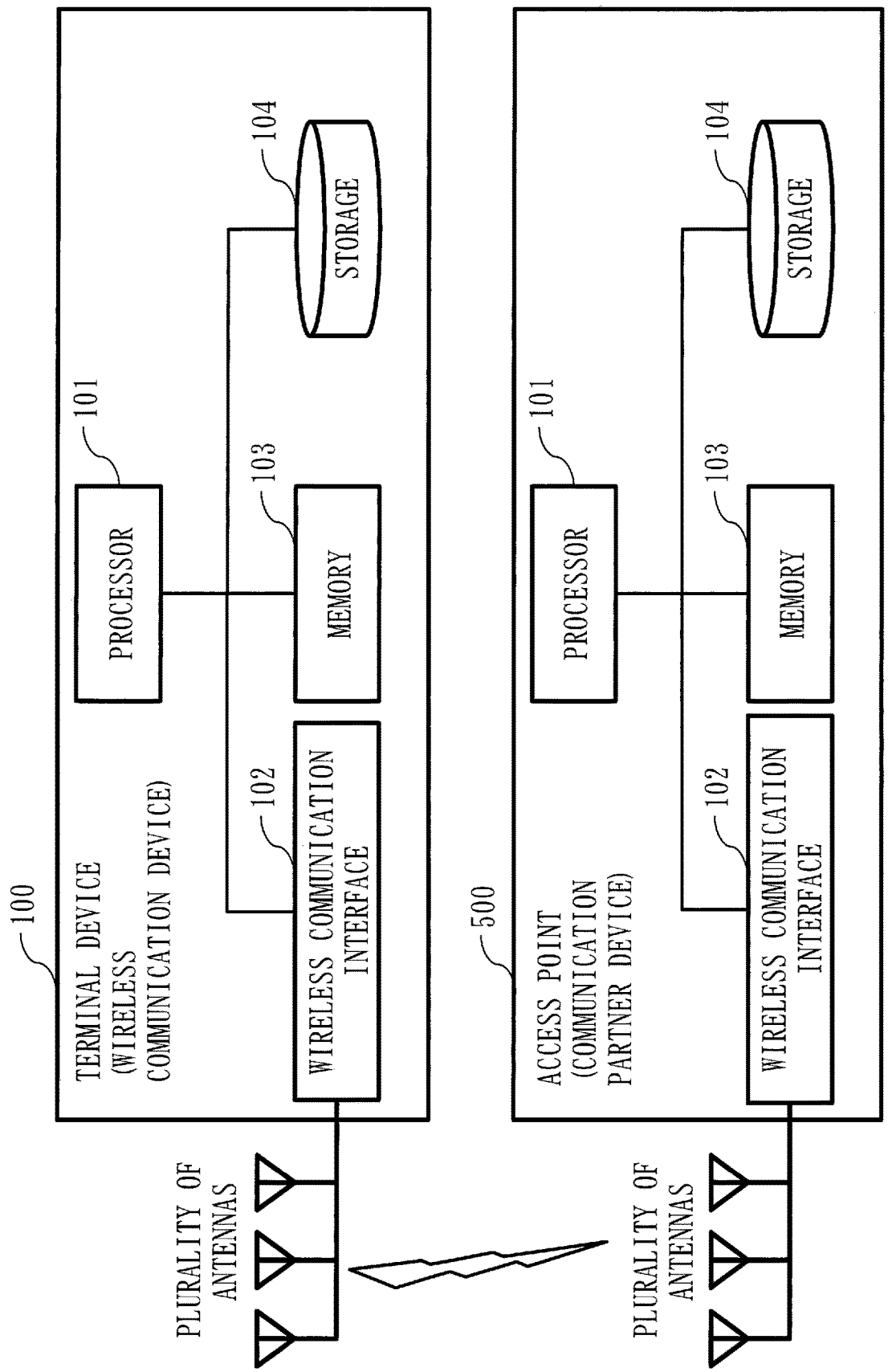
FIG. 2 is a hardware configuration diagram of a terminal device 100 and an access point 500 in Embodiment 1.

FIG. 2 is a hardware configuration diagram of a terminal device 100 and an access point 500 in Embodiment 1.

The terminal device 100 is a computer. The terminal device 100 is provided with hardware devices which are a processor 101, a wireless communication interface 102, a memory 103, and a storage 104. The processor 101 is connected to the other hardware devices via a signal line and controls the other hardware devices. The wireless communication interface 102 is provided with a plurality of antennas. The plurality of antennas are required in a latter process for obtaining a direction of an access point.

A hardware configuration of the access point 500 is the same as that of the terminal device 100.

Figure 3:
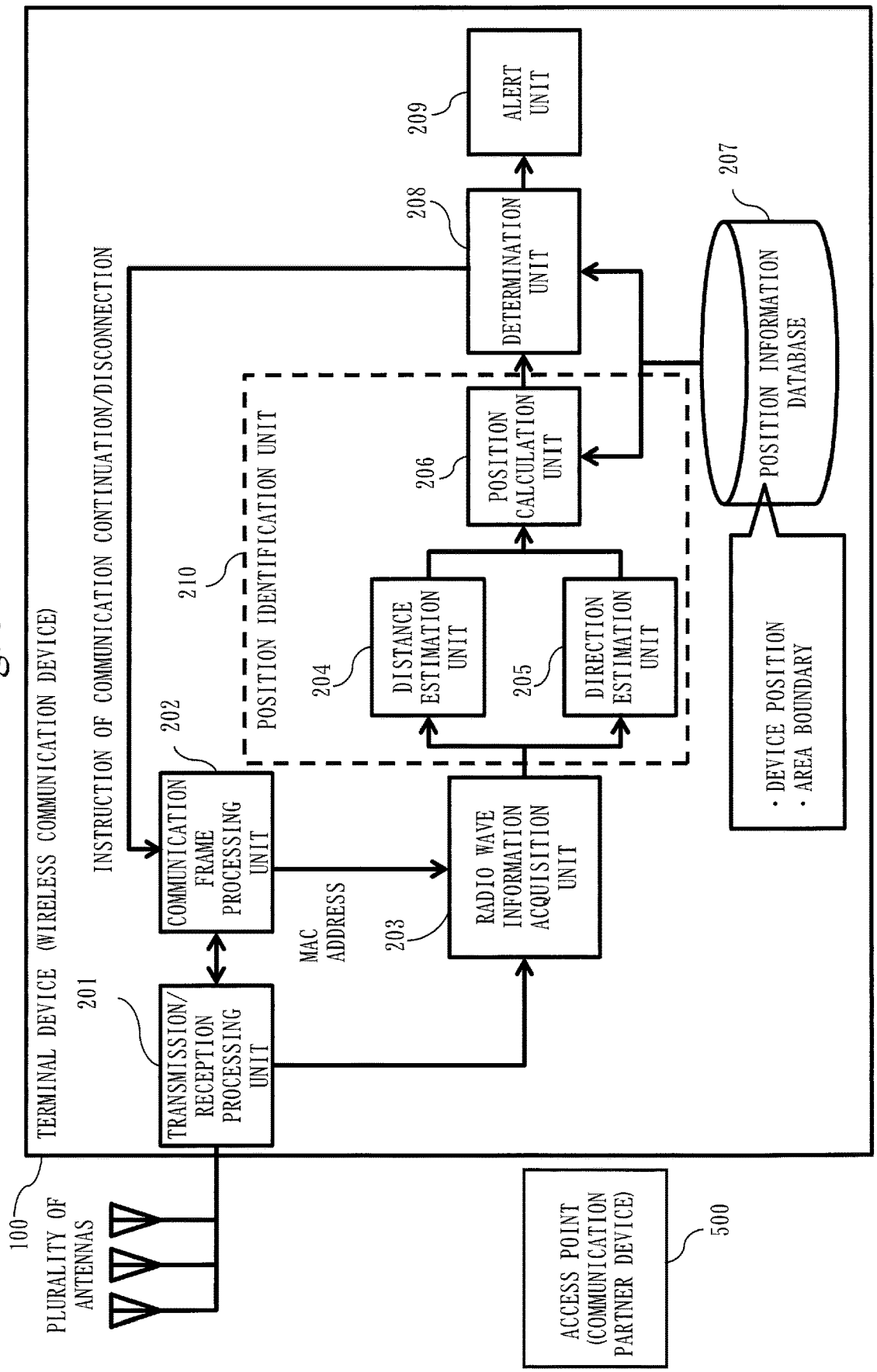
FIG. 3 is a function configuration diagram of the terminal device 100 in Embodiment 1.

FIG. 3 is a function configuration diagram of the terminal device 100.

The terminal device 100 is provided with a transmission/reception processing unit 201, a communication frame processing unit 202, a radio wave information acquisition unit 203, a position identification unit 210, a position information database 207, a determination unit 208, and an alert unit 209, as function constituent elements. The position identification unit 210 has a distance estimation unit 204, a direction estimation unit 205, and a position calculation unit 206.

Figure 4:
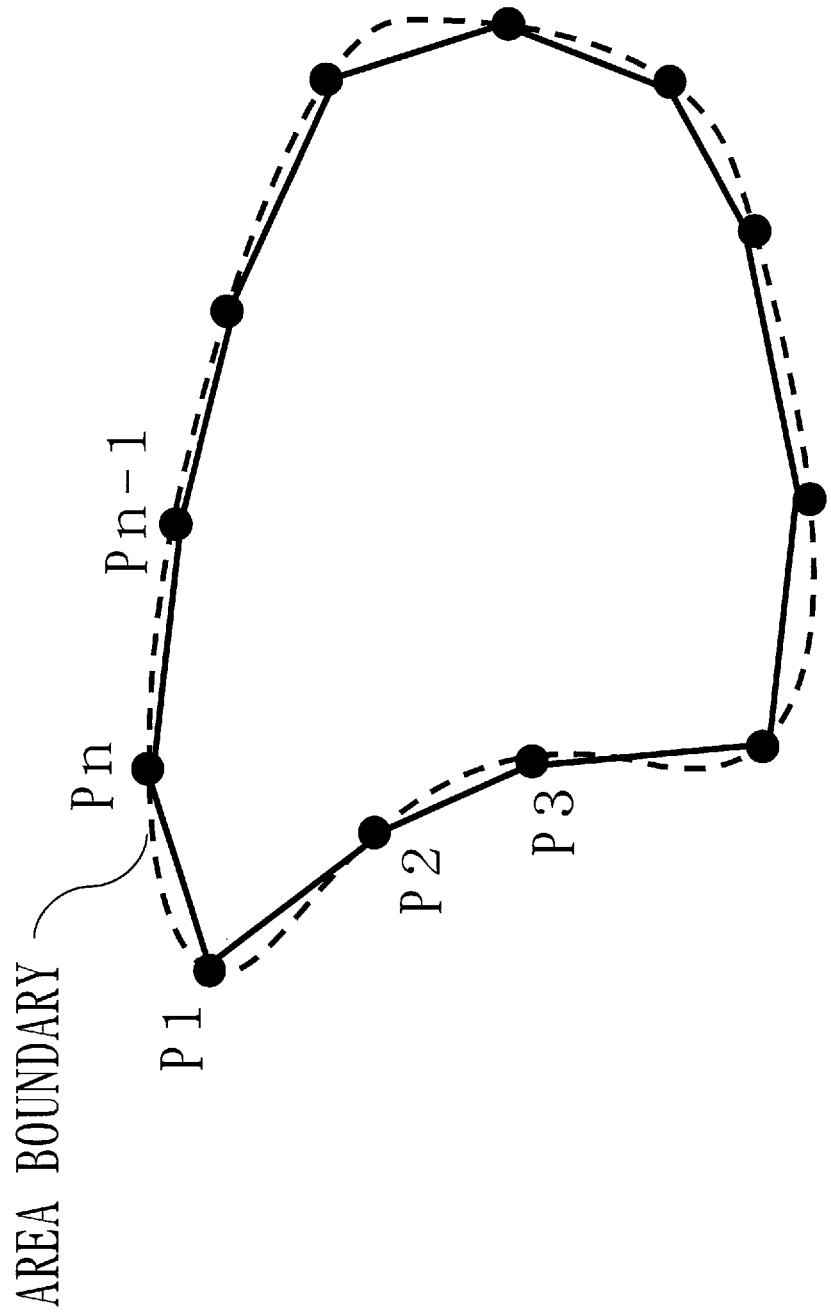
FIG. 4 is a diagram in which an area boundary in Embodiment 1 is approximated to an n-sided polygon.

The position information database 207 holds a device position and an area boundary as map information. The device position signifies, for example, a set of a latitude, a longitude, and an altitude of the terminal device. However, a makeup of the position information is not limited to this example. The area boundary signifies, for example, sets of a latitude, a longitude, and an altitude of vertices P1 to Pn of an n-sided polygon when the area boundary is approximated to the n-sided polygon as in FIG. 4. If the area boundary is not convex and the approximated n-sided polygon expands to the outside of the area, the area may be deformed to an n-sided polygon by approximation of, for example, 50 cm inside the area boundary so that the approximated n-sided polygon is accommodated in the area. Note that the deforming method is not limited to this example.

The processor 101 runs programs of the transmission/reception processing unit 201, the communication frame processing unit 202, the radio wave information acquisition unit 203, the distance estimation unit 204, the direction estimation unit 205, the position calculation unit 206, the determination unit 208, and the alert unit 209, while running an operating system, a network driver, and a storage driver.

The programs that execute functions of the transmission/reception processing unit 201, the communication frame processing unit 202, the radio wave information acquisition unit 203, the position identification unit 210, the determination unit 208, and the alert unit 209; and the operating system; the network driver; and the storage driver, which are stored in the storage 104 are read by the memory 103 and run by the processor 101.

The position information database 207 is read by the memory 103 and looked up by the processor 101.

Data, information, signal values, and variable values which are utilized, processed, or outputted by the programs that implement the individual function constituent elements of FIG. 3 are stored in the memory 103, the storage 104, or a register or cache memory in the processor 101.

The term "unit" in the transmission/reception processing unit 201, the communication frame processing unit 202, the radio wave information acquisition unit 203, the position identification unit 210, the determination unit 208, and the alert unit 209 may be replaced by "process", "procedure", or "stage". Also, the term "process" in the individual process of each of the transmission/reception processing unit 201, the communication frame processing unit 202, the radio wave information acquisition unit 203, the position identification unit 210, the determination unit 208, and the alert unit 209 may be replaced by "program".

The programs may be stored in a computer readable recording medium and provided. The programs may be provided as a program product.

A wireless communication method is a method that is practiced by the wireless communication device running the programs.

The wireless communication device may be implemented by a processing circuit such as a logic integrated circuit (IC), a gate array (GA), an application specific integrated circuit (ASIC), and a field-programmable gate array (FPGA).

A combination of a processor and a memory, or a processing circuit is called processing circuitry. The combination of the processor and the memory, or the processing circuit is a specific example of processing circuitry.

DESCRIPTION OF OPERATIONS

Figure 5:
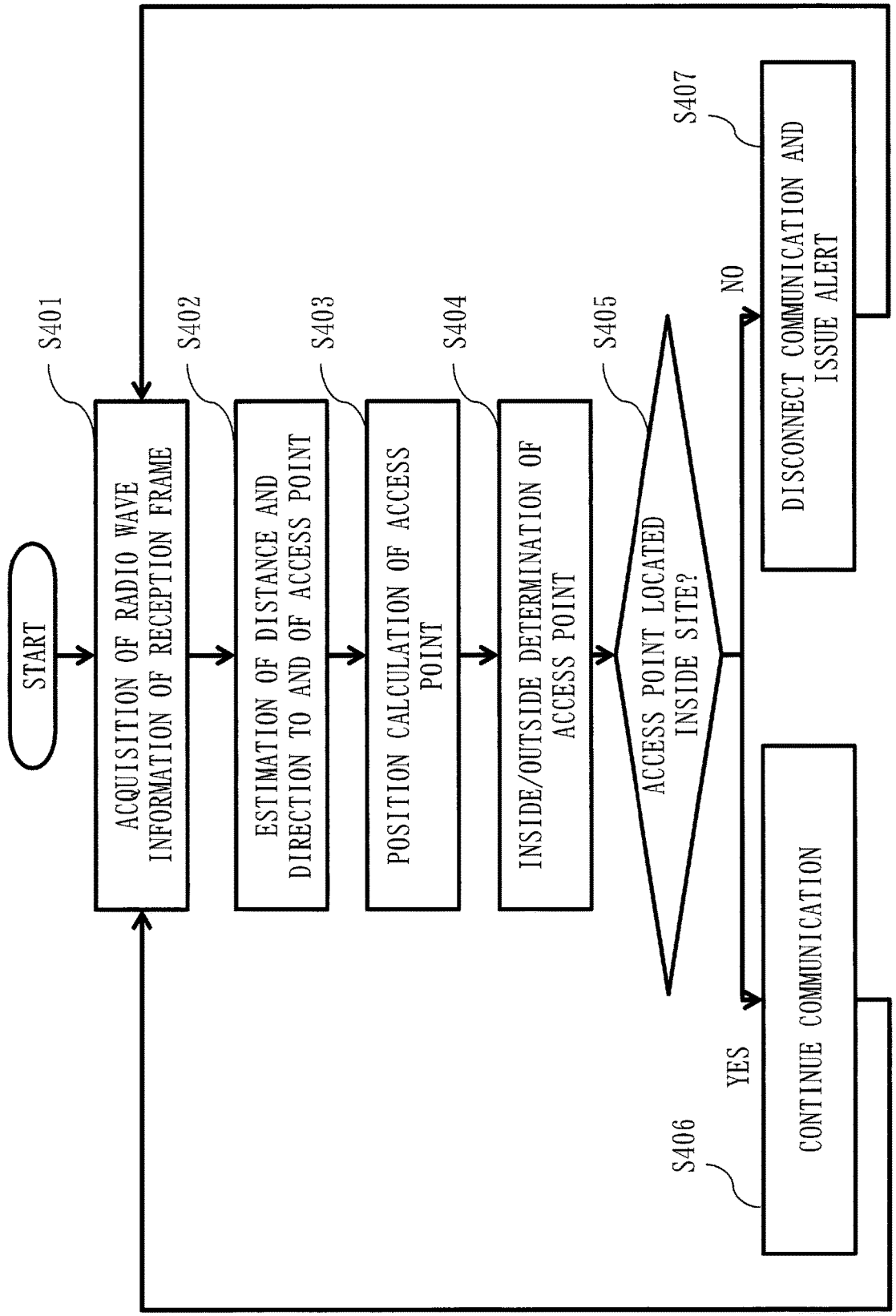
FIG. 5 is an operation flowchart of the terminal device 100 in Embodiment 1.

FIG. 5 is an operation flowchart of the terminal device 100 in Embodiment 1, and illustrates the wireless communication method.

Step S401: Acquisition of Radio Wave Information of Reception Frame

First, radio wave information signifies a physical quantity of a communication radio wave, and in Embodiment 1 refers to a phase of a reception radio wave. As the acquisition method, for example, a method of acquiring data called channel state information (CSI) is available, CSI being defined by IEEE 802.11 and Wi-Fi which are wireless communication standards. Note that CSI is information used in a process of optimizing a communication quality. CSI is a set of amplitude and phase about a reception radio wave which is obtained per reception frame and per antenna. Below, the radio wave information will be described assuming this CSI. The radio wave information may be data of another wireless communication standard, or another data, as far as at least a phase of the reception radio wave can be obtained as a physical quantity.

The plurality of antennas of the terminal device 100 receive the radio wave from the access point 500. The transmission/reception processing unit 201 converts an analog signal which is the radio wave into a digital signal. The communication frame processing unit 202 takes the digital signal as a communication frame. During a process of converting the analog signal into digital information, the transmission/reception processing unit 201 sends the signal under processing (for example, a result of discrete Fourier transform of the radio wave) to the radio wave information acquisition unit 203. The communication frame processing unit 202 sends a MAC address of the access point 500 obtained from the acquired frame to the radio wave information acquisition unit 203. The radio wave information acquisition unit 203 acquires radio wave information from the signal obtained from the transmission/reception processing unit 201. The radio wave information acquisition unit 203 associates the radio wave information with the MAC address obtained from the communication frame processing unit.

At this time, the radio wave information may cover one communication frame, or a plurality of communication frames. With the radio wave information covering a plurality of communication frames, an accuracy in estimating the position of the access point 500 is higher than with the radio wave information covering one communication frame. When estimating the position of the access point with using the radio wave information covering the plurality of communication frames, the MAC address and the communication frame are associated with each other and are held. Hence, which communication frame is received from which access point is distinguished.

An operation target of step S402 through step S407 below may be one communication frame, or may be a plurality of communication frames associated with the same MAC address.

From step S402 through step S405, the transmission/reception processing unit 201 and the communication frame processing unit 202 may communicate with the access point 500, or may suspend communication with the access point 500 until step S405 is ended.

Step S402: Estimation of Distance and Direction to and of Access Point 500

The radio wave information acquisition unit 203 sends the radio wave information and the MAC address to the distance estimation unit 204 and the direction estimation unit 205.

The distance estimation unit 204 estimates a distance to the access point 500 from the accepted radio wave information. As the estimation method, for example, a method is available which, by utilizing the fact that radio waves of different frequencies are transmitted simultaneously in IEEE 802.11 and Wi-Fi by frequency division multiplexing, estimates the distance from a phase difference of each frequency (Non-Patent Literature 1). The distance estimation unit 204 associates the distance and the MAC address with each other and sends the distance and the MAC address to the position calculation unit 206.

The direction estimation unit 205 estimates, from the accepted radio wave information, the direction of the access point 500 seen from a terminal device. As the estimation method, for example, a method is available which estimates the direction from phase differences of a plurality of antennas disposed in a row with the same spacing. Also, a method is available which applies a direction estimation algorithm, such as multiple signal classification (MUSIC) and estimation of signal parameters via rotational invariance techniques (ESPRIT), to phases of a plurality of antennas disposed in a row with the same spacing. Further, a method is available which estimates the direction by straight line fitting on the basis of following. Namely, in IEEE 802.11 and Wi-Fi, radio waves of different frequencies are transmitted simultaneously by frequency division multiplexing, and when plotting phases of radio waves transmitted simultaneously per frequency, the plotting results form a straight line. A gradient of the straight line corresponds to the direction. The direction estimation unit 205 associates the direction and the MAC address with each other and sends them to the position calculation unit 206.

Step S403: Position Calculation of Access Point 500

The position calculation unit 206 refers to the distance to the access point 500 and the MAC address of the access point 500 which are accepted from the distance estimation unit 204, and the direction of the access point 500 and the MAC address of the access point 500 which are accepted from the direction estimation unit 205, and refers to a device position in the position information database 207, so as to calculate a position of the access point 500.

The position calculation unit 206 adds to the device position a vector formed of a distance and a direction, so as to calculate the position of the access point 500. The position calculation unit 206 associates the position and the MAC address with each other and sends them to the determination unit 208.

Step S404: Inside/Outside Determination of Access Point 500

The determination unit 208 determines whether or not the access point 500 is inside the area from the position of the access point 500 accepted from the position calculation unit 206 and from the area boundary in the position information database 207.

As the determination method, a Crossing Number Algorithm is employed which determines that the access point 500 is inside the area if a ray extending from the position of the access point 500 as a start point crosses the area boundary an odd number of times. Alternatively, as the determination method, a Winding Number Algorithm as follows is employed. Assume an n-sided polygon that approximates the area boundary. When vertices of the n-sided polygon are seen from the position of the access point 500, if angles (signed angles each being 0 degrees in a certain direction; counterclockwise rotation from that direction counts as positive) of the vertices total exactly 360 degrees, the access point 500 is inside the area.

Step S405: Access Point 500 Located Inside Site?

As a result of the inside/outside determination performed by the determination unit 208, if the access point 500 is determined to be located inside the area, step S406 is executed. If the access point 500 is determined to be located outside the area, step S407 is executed.

When processing one communication frame, step S406 or step S407 is executed depending on the result of the inside/outside determination performed for the one communication frame.

When processing a plurality of communication frames at once which are associated with the same MAC address, if it is determined that for every one of the plurality of communication frames the access point 500 is located inside area, step S406 is executed. Otherwise, step S407 is executed.

Step S406: Continue Communication

The determination unit 208 sends a communication continuation instruction and the MAC address of the access point 500 to the communication frame processing unit 202. The communication frame processing unit 202 continues normal operation.

Step S407: Disconnect Communication and Issue Alert.

The determination unit 208 sends a disconnection instruction and the MAC address to the communication frame processing unit 202. If communication with the access point 500 has been established, the communication frame processing unit 202 disconnects the communication. The determination unit 208 sends the position of the access point 500 which is determined to be outside the area, and the MAC address of the access point 500, to the alert unit 209. The alert unit 209 notifies, as an alert, the user of the position and MAC address of the access point 500 which are accepted from the determination unit 208. As the notification method, for example, if the terminal device is equipped with a display, a method of displaying an image is available. If the terminal device is equipped with a speaker, a method of producing a sound is available. Alternatively, an alert may be held in the terminal device. When access to the authorized access point 500 can be made later on, the administrator of the wireless network may be notified of the alert by an email.

Effect in Embodiment 1

As described above, in Embodiment 1, the terminal device identifies the position of the access point 500 by itself and determines whether or not the access point 500 is authorized from position information of the access point 500. Therefore, even when a high-directivity radio wave is irradiated only to an authorized terminal device from an unauthorized access point, the terminal device can detect the unauthorized access point and can disconnect communication, so that the terminal device is protected from the unauthorized access point.

In Embodiment 1, the position of the unauthorized access point is identified, and the user or the administrator is notified of an alert. Therefore, a countermeasure of physically eliminating the unauthorized access point can be taken. This countermeasure is effective against a random attack such as communication jamming done by transmitting a large quantity of communication frames, as well as against an attack on the terminal device by the unauthorized access point described above.

Also, in Embodiment 1, since the position of the access point 500 is estimated by using the radio wave information of the communication frame, there is no need to mount a sensor separately. Thus, an effect of identifying the position while performing wireless communication can be achieved.

The following are modifications of Embodiment 1. A plurality of modifications may be combined.

Modification 1

In Embodiment 1, the operations of FIG. 5 are performed per reception frame. Modification 1 may be available in which the radio wave information acquisition unit 203 starts the operations of FIG. 5 per reception of a particular type of frame, such as an authentication request frame that serves as a trigger for establishing communication and a disconnection request frame that serves as a trigger for communication disconnection, so that a frequency of position estimation and a frequency of inside/outside determination about the access point 500 may be decreased.

Modification 2

In Embodiment 1, there is a possibility that position estimation and inside/outside determination are performed over and over again about the same access point 500. In Modification 2, the communication frame processing unit 202 registers the MAC address of the access point 500 determined by the determination unit 208 to be inside the area, with an authorization list, and holds the MAC address in the memory 103. The communication frame processing unit 202 checks in step S401 whether the MAC address of the access point 500 coincides with the MAC address registered with the authorization list, and if they coincide, continues communication by skipping step S402 and beyond. If the MAC address of the access point 500 does not coincide with the MAC address registered with the authorization list, the communication frame processing unit 202 performs step S402 and beyond.

Also, the communication frame processing unit 202 registers the MAC address of the access point 500 determined by the determination unit 208 to be outside the area, with a non-authorization list, and holds the registered MAC address in the memory 103. The communication frame processing unit 202 checks in step S401 whether the MAC address of the access point 500 coincides with the MAC address registered with the non-authorization list, and if they coincide, disconnects communication by using the MAC address, and issues an alert.

Modification 3

Figure 6:
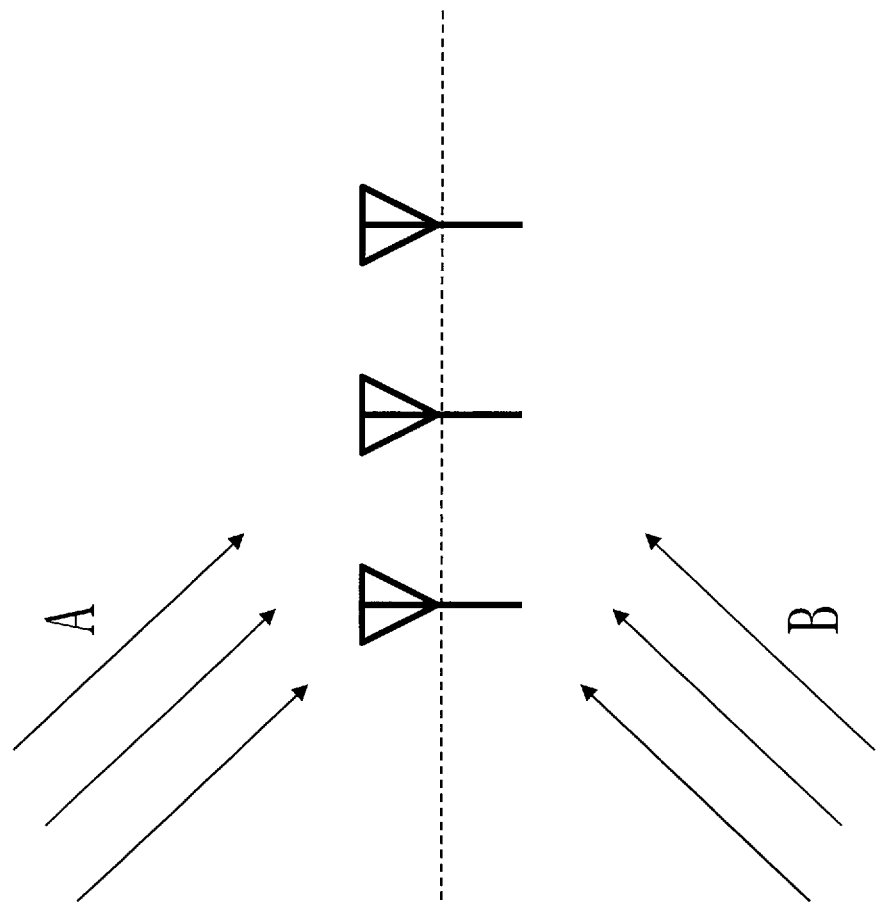
FIG. 6 is a diagram of Modification 3 in Embodiment 1 illustrating radio waves coming from line-symmetric directions.

Embodiment 1 demonstrates, as the method of direction estimation, a method of guessing the direction from phase differences of a plurality of antennas disposed in a row with the same spacing. With this method, however, as illustrated in FIG. 6, the phase differences among the antennas are the same between radio waves coming from a certain direction A and radio waves B coming from a direction axially symmetric with the direction A about the antenna row, and accordingly these directions of the radio waves cannot be distinguished from each other. In the wireless communication device, radio waves can come from all directions of 360 degrees. Therefore, it is desirable to be able to distinguish the directions of the radio waves.

Figure 7:
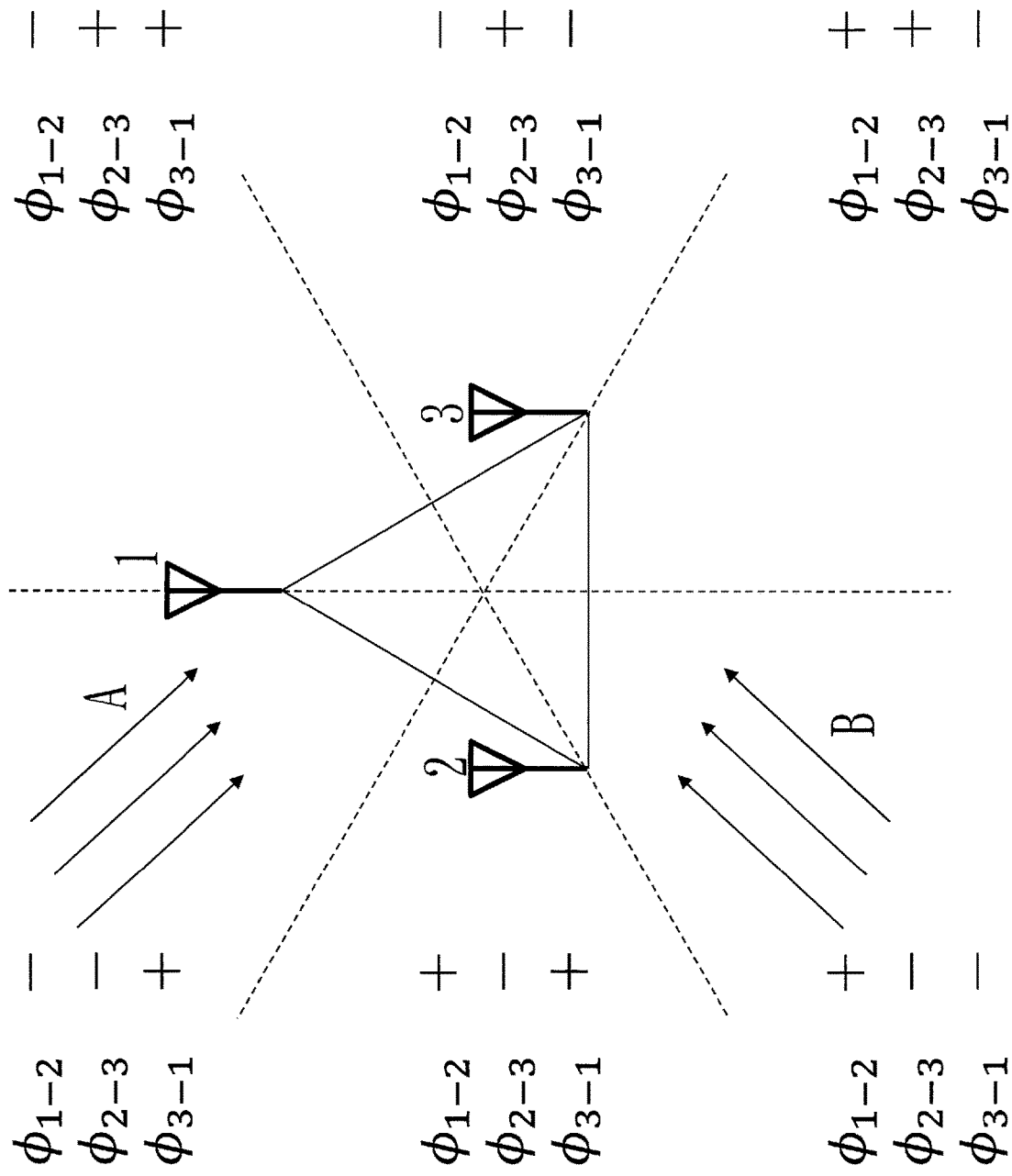
FIG. 7 is a diagram of Modification 3 in Embodiment 1 illustrating use of three antennas.

In view of this, Modification 3 may be available in which the terminal device 100 has three antennas placed to form a regular triangle as illustrated in, for example, FIG. 7, so that all directions of 360 degrees can be distinguished. If a difference obtained by subtracting a phase acquired by an antenna 2 from a phase acquired by an antenna 1 is defined as $\Phi$1-2, and if $\Phi$2-3 and $\Phi$3-1 are defined likewise, the direction estimation unit 205 can distinguish 360 degrees by dividing them into six groups on a basis of + and − signs of $\Phi$1-2, $\Phi$2-3, and $\Phi$3-1.

Modification 4

Embodiment 1 is based on a premise that the terminal device is fixed at a particular spot inside the area. If the terminal device shifts (including rotation at the spot) freely within the area, Modification 4 may be available in which the terminal device 100 is provided with an electromagnetic compass and a global positioning system (GPS) so that each time step S403 is performed, the device position is updated.

Figure 8:
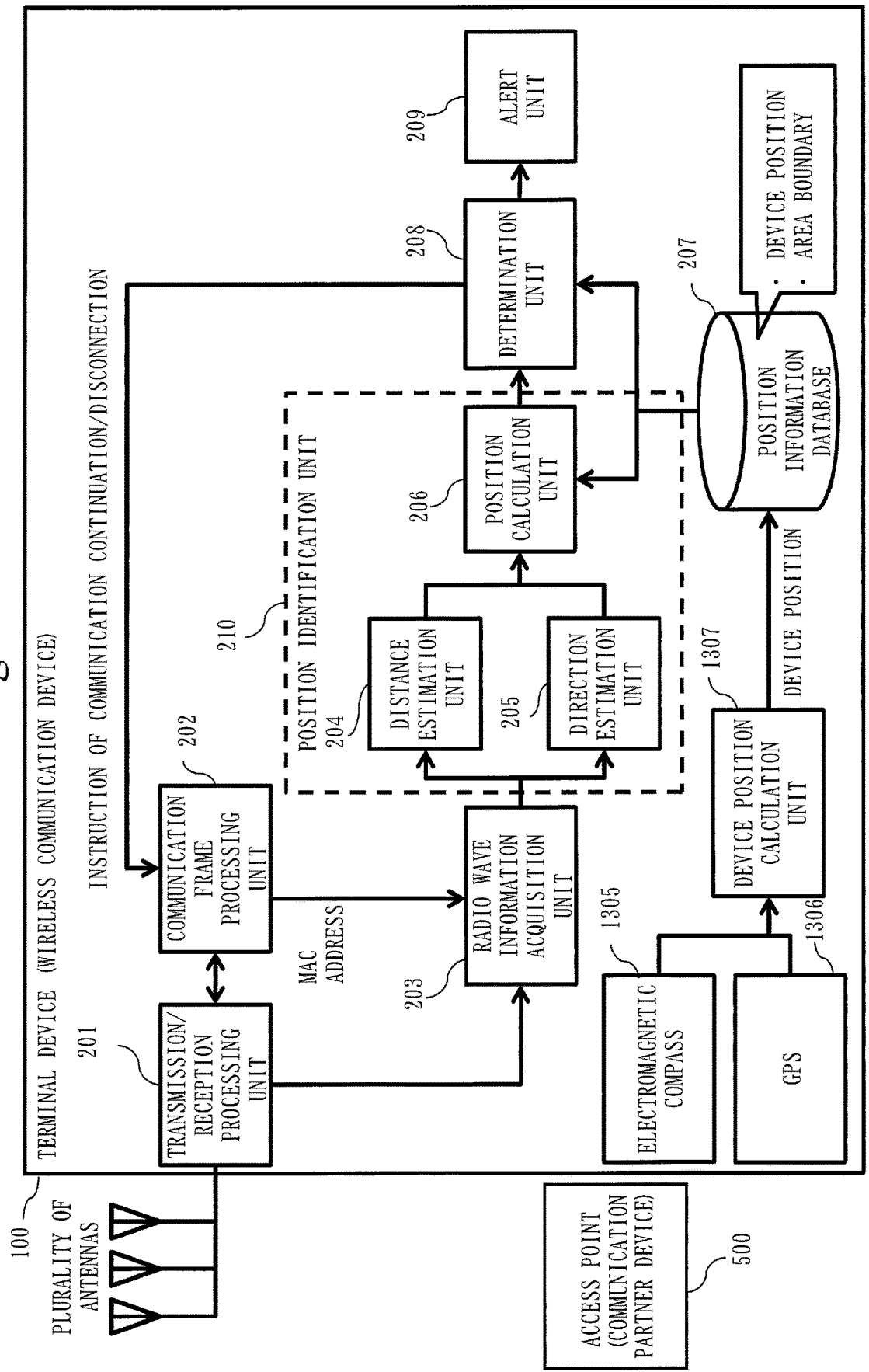
FIG. 8 is a diagram illustrating a configuration of Modification 4 in Embodiment 1.

FIG. 8 illustrates a configuration of Modification 4. In FIG. 8, an electromagnetic compass 1305, a GPS 1306, and a device position calculation unit 1307 are added to the configuration (FIG. 3) of Embodiment 1. The device position calculation unit 1307 calculates the device position of the terminal device 100 from an output of the electromagnetic compass 1305 or the GPS 1306. The device position calculation unit 1307 stores the new device position to the position information database 207.

Modification 5

Modification 5 is premised on the following.
1. There are a plurality of authorized access points which are all fixed at particular positions.
2. The terminal device 100 associates the MAC addresses and positions of the authorized access points with each other and holds them in the position information database 207.
3. There is a possibility that an unauthorized access point spoofs an authorized access point by disguising itself with an acquired MAC address and an acquired SSID.

In Modification 5, the device position of the position information database 207 is calculated backwards from the position of the authorized access point whose MAC address is the same as the MAC address of the access point 500, and the device position in the position information database 207 is updated with the backwardly calculated device position.

However, there is a possibility that the access point 500 used for backward calculation is spoofed. Hence, for one terminal device 100, a plurality of device positions are calculated backwards from positions of a plurality of authorized access points. Only when differences between the plurality of device positions fall within variations of approximately an estimation error, the device position of the terminal device 100 is updated. If the plurality of device positions differ by the estimation error or more, it is concluded that one of the access points 500 used for the backward calculation may be spoofed, and the alert unit 209 is notified of a candidate for the unauthorized access point used for the backward calculation.

Figure 9:
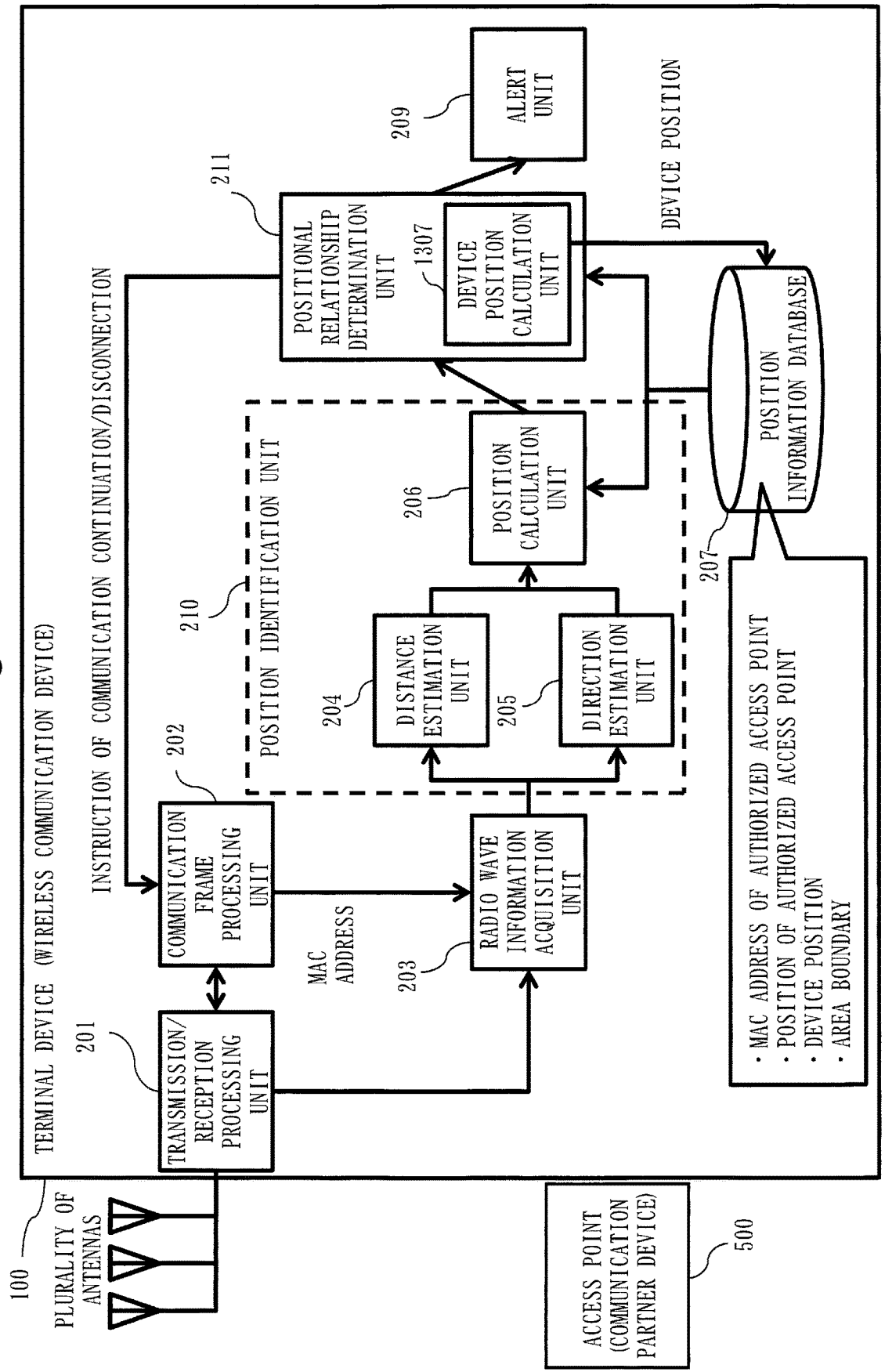
FIG. 9 is a diagram illustrating a configuration of Modification 5 in Embodiment 1.

FIG. 9 illustrates a configuration of Modification 5. In FIG. 9, the determination unit 208 having the configuration (FIG. 3) in Embodiment 1 is changed to a positional relationship determination unit 211. Also, information stored in the position information database 207 is different. The position information database 207 associates the MAC address and position of the authorized access point with each other and stores them.

Figure 10:
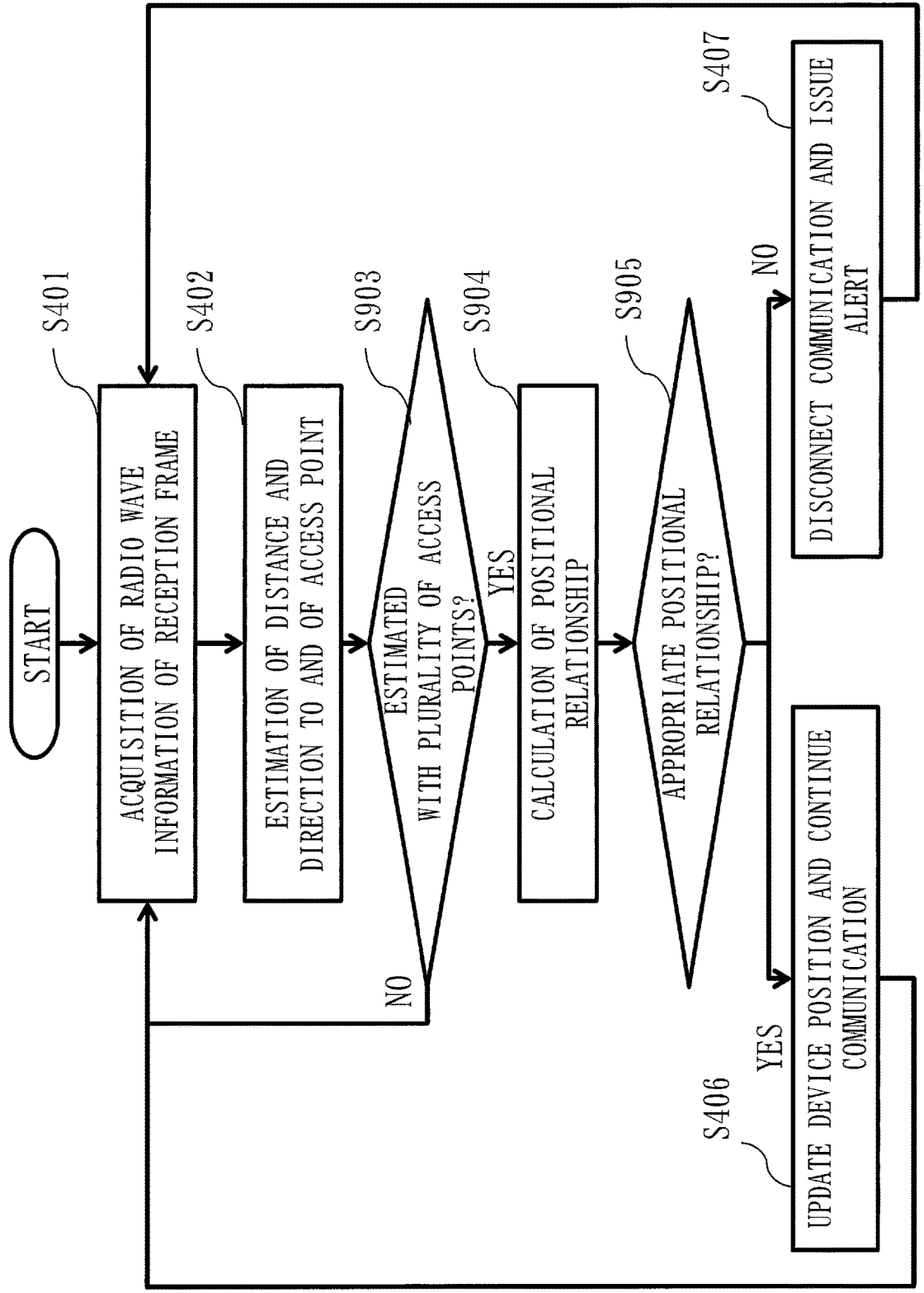
FIG. 10 is an operation flowchart of Modification 5 in Embodiment 1.

FIG. 10 illustrates an operation flowchart of Modification 5. A difference from the operation chart (FIG. 5) in Embodiment 1 will be described.

Step S903: Estimated with Plurality of Access Points 500?

Considering the possibility that an access point 500 is spoofed, the position calculation unit 206 determines whether there are a distance and a direction which are estimated about the plurality of access points 500. If YES, the processing proceeds to calculation of positional relationship of step S904. If NO, the processing returns to step S401, and radio wave information of another access point 500 is acquired.

Step S904: Calculation of Positional Relationship

The positional relationship determination unit 211 determines the following for each of the plurality of access points 500.

The positional relationship determination unit 211 checks whether the same MAC address as the MAC address of the access point 500 is stored in the position information database 207. If the same MAC address as the MAC address of the access point 500 is not stored in the position information database 207, the positional relationship determination unit 211 determines that the access point 500 is an unauthorized access point.

If the same MAC address as the MAC address of the access point 500 is stored in the position information database 207, the device position calculation unit 1307 acquires a position of the authorized access point whose MAC address is the same as the MAC address of the access point 500, from the position information database 207.

The device position calculation unit 1307 adds an inverse vector of a vector obtained from the distance from the terminal device 100 to the access point 500 and the direction of the access point 500 from the terminal device 100, to the position of the authorized access point, thereby calculating the device position based on the authorized access point.
Step S905: Appropriate Positional Relationship?

If the differences between the plurality of device positions obtained in step S904 fall within a range of approximately the estimation error, the positional relationship determination unit 211 determines that the positional relationship is appropriate, and proceeds to step S406. In step S406, the device position calculation unit 1307 stores a new device position to the position information database 207.

If the differences between the plurality of device positions do not fall within the range of approximately the estimation error, the positional relationship determination unit 211 concludes that one of the access points used for backward calculation is a spoof, and proceeds to step S407. As information to be included in the alert of step S407, the positional relationship determination unit 211 finds a candidate for the position of the unauthorized access point.

How to find the candidate for the position of the unauthorized point by the positional relationship determination unit 211 will be described with referring to FIG. 11 on the following premises.

1. The authorized terminal device receives communication frames from an authorized access point 2.
2. The authorized terminal device receives communication frames from an unauthorized access point 1 spoofing an authorized access point 1.
3. The unauthorized access point 1 spoofs the authorized access point 1 by disguising itself with the MAC address and SSID of the authorized access point 1.

Concerning the device position calculated backwards from the authorized access point 2, an inverse vector V1 is added to the position of the authorized access point 2 corresponding to the same MAC address as the MAC address of the access point 2, thus obtaining a position T1.

Concerning the device position calculated backwards from the unauthorized access point 1, an inverse vector V2 is added to the position of the authorized access point 1 corresponding to the same MAC address as the MAC address of the unauthorized access point 1, thus obtaining a position T2.

At this time, the position T1 and the position T2 are largely distant from each other. Since the device positions (T1 and T2) which are calculated backwards from the two authorized access points are largely different from each other, the authorized terminal device can determine either one or the other is a spoof access point. However, the terminal device cannot determine which access point is the unauthorized access point. Hence, for each one of the two access points, the following operation is performed: assuming one access point as an authorized access point and calculating a position of the other access point. The two calculated positions are employed as candidates for the position of the unauthorized access point.

Figure 11:
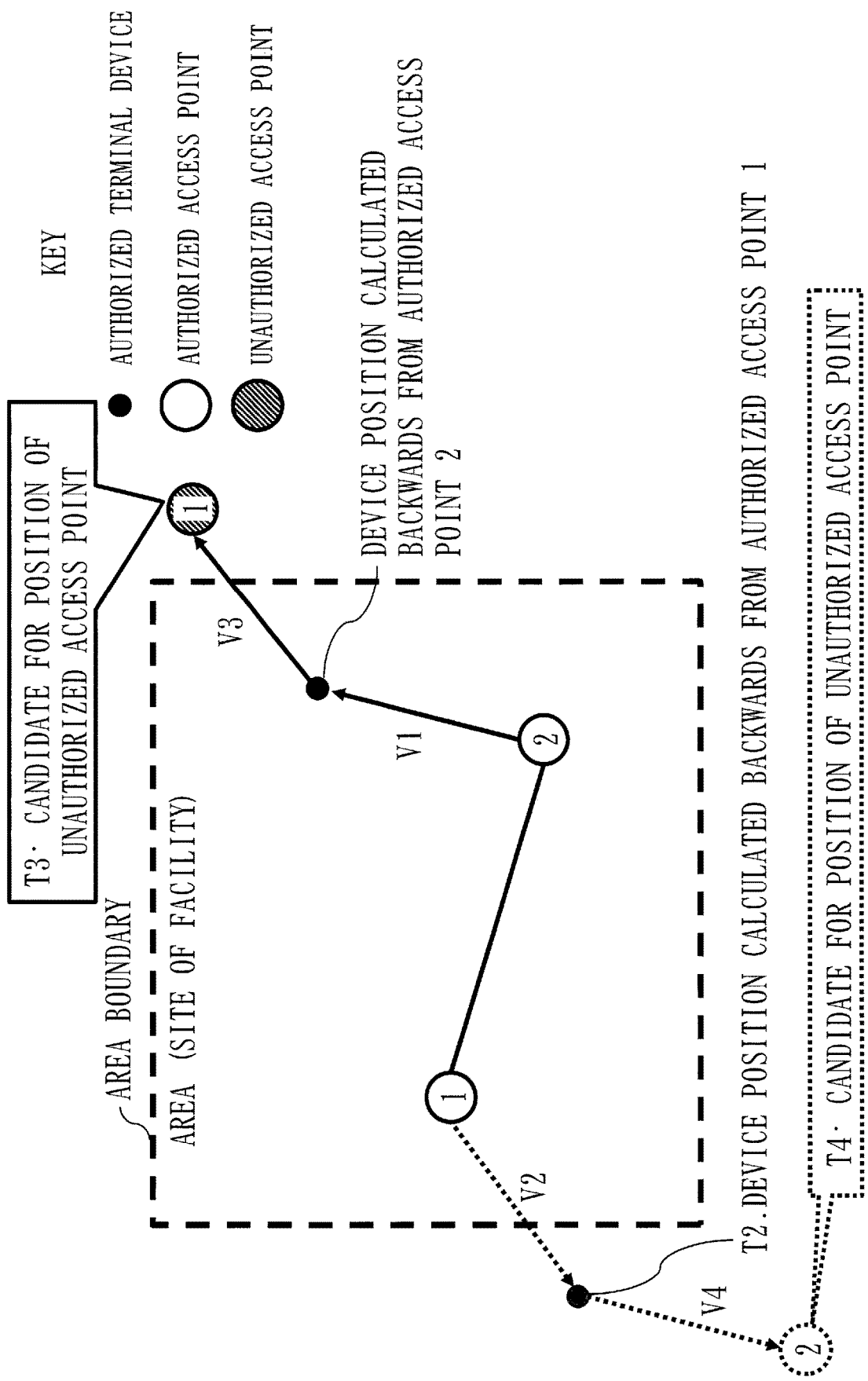
FIG. 11 is a diagram of Modification 5 in Embodiment 1 illustrating candidates for a position of an unauthorized access point.

In the case of FIG. 11, when the authorized access point 2 is regarded as the authorized access point, the position of the terminal device is T1. The positional relationship determination unit 211 calculates a position T3 by adding an inverse vector V3 of the vector extending from the terminal device to the unauthorized access point 1, to the position T1 of the terminal device, and takes the position T3 as a candidate for the position of the unauthorized access point.

On the other hand, when the unauthorized access point 1 is regarded as the authorized access point, the position of the terminal device is T2. The positional relationship determination unit 211 calculates a position T4 by adding an inverse vector V4 of the vector extending from the terminal device to the authorized access point 2, to the position T2 of the terminal device, and takes the position T4 as a candidate for the position of the unauthorized access point.

In this manner, depending on which access point is regarded as authorized, there can be a plurality of possible candidates for the unauthorized access point.

The positional relationship determination unit 211 sends the candidate for the position of the unauthorized access point to the alert unit 209.

In FIG. 11, the authorized terminal device receives communication frames only from two access points. However, in step S903, a number of access points which is used as a threshold value may be three or more, and unauthorized access points may be narrowed down by majority determination.

Modification 6

In Embodiment 1, there is no restriction for the type of communication frame whose CSI is to be acquired. However, if a method that is unrealistic for ordinary communication is employed, such as a method of sending a Ping until radar processing is ended and a method of replaying an address resolution protocol (ARP), a sophisticated attacker is likely to notice that he or she is being traced in some way or other. Therefore, in Modification 6, the communication frame processing unit 202 transmits a communication packet that simulates an internal network environment so as to gain communication frames in a number that is necessary for position calculation of the access point.

On the side of the attacker, if communication from the terminal device is cut off, the fact that an authorized access point is spoofed will be revealed. Hence, the attacker has no choice but to respond to the communication from the terminal device in some way. The communication frame processing unit 202 transmits requests that simulate the internal network environment by changing stepwise a plurality of protocols such as ARP, domain name system (DNS), and hypertext transfer protocol (HTTP), thereby gaining communication frames automatically.

Note that a response from the unauthorized access point may be leading to an unauthorized web site, and that transmission of the simulated communication packets merely aims at gaining time for position calculation. Thus, the radio wave information acquisition unit 203 discards the response from the access point immediately after radio wave information is acquired.

In a testing environment, only by starting up the browser and accessing Youtube (registered tradename) via Google (registered tradename) search, approximately 4,000 communication frames were obtained. This number of communication frames is sufficient when compared to distance calculation in Non-Patent Literature 1.

Modification 7

In Embodiment 1, the terminal device 100 estimates the position of the access point 500 and determines whether the access point 500 is authorized or unauthorized, thereby performing access control. That is, the terminal device 100 is an example of a wireless communication device, and the access point is an example of a communication partner device. Modification 7 may be available in which the relationship between the terminal device 100 and the access point 500 is reversed. The access point 500 estimates the position of the terminal device 100 and determines whether the terminal device 100 is authorized or unauthorized, thereby performing access control. That is, the access point 500 may be an example of a wireless communication device, and the terminal device 100 may be an example of a communication partner device.

Modification 8

Embodiment 1 is premised on "an unauthorized access point installed by an attacker spoofs an access point by disguising the SSID but does not disguise the MAC address". Except for Modifications 2 and 5, when performing inside/outside determination per communication frame (for all communication frames), this determination may apply also for a case where an unauthorized access point installed by an attacker spoofs an authorized access point by disguising both the MAC address and the SSID.

For example, in a case where an authorized access point makes communication with using MAC address=100 and the operations illustrated in FIG. 5 are performed, if it can be determined that the position of the authorized access point is inside the area, then the communication is continued. In a case where an unauthorized access point makes communication with using MAC address=100 by disguising the MAC address and the operations illustrated in FIG. 5 are performed, if it can be determined that the position of the unauthorized access point is outside the area, then it is possible to cut off the communication.

Characteristics of Embodiment 1

The wireless communication device of Embodiment 1 is provided with the position information database 207 in which map information is stored. The position information database 207 stores the device position of the wireless communication device and the area boundary of the area where the communication partner device should exist, as the map information.

The radio wave information acquisition unit 203 extracts the physical quantity of the communication radio wave received from the communication partner device.

The position identification unit 210 identifies the position of the communication partner device on a basis of the physical quantity acquired by the radio wave information acquisition unit 203.

The determination unit 208 collates the position of the communication partner device which is identified by the position identification unit 210, with the map information stored in the position information database, and determines whether the communication partner device is an authorized device or an unauthorized device. The determination unit 208 collates the position of the communication partner device with the area boundary, and determines whether the communication partner device is an authorized device or an unauthorized device.

The radio wave information acquisition unit 203 needs to extract only the phase of the communication radio wave, as the physical quantity.

The position identification unit 210 has the distance estimation unit 204, the direction estimation unit 205, and the position calculation unit 206.

The distance estimation unit 204 estimates the distance to the communication partner device on a basis of the phase of the communication radio wave.

The direction estimation unit 205 estimates the direction where the communication partner device exists on a basis of the communication radio wave phase.

The position calculation unit 206 calculates the position of the communication partner device on a basis of the device position of the wireless communication device, the distance to the communication partner device, and the direction of the communication partner device.

The communication frame processing unit 202 registers, with the authorization list, a communication partner device determined by the determination unit 208 as being an authorized device, and causes the communication partner device registered with the authorization list to continue communication.

The device position calculation unit 1307 updates the device position of the wireless communication device which is stored in the position information database.

The positional relationship determination unit 211 calculates the position of the wireless communication device backwards from positions of a plurality of communication partner devices, and determines a position of a candidate for an unauthorized communication partner device on a basis of a backward calculation result.

The wireless communication device of Embodiment 1 is provided with a plurality of antennas. The direction estimation unit 205 finds the direction of the communication partner device with using phases obtained from the plurality of antennas.

The wireless communication device of Embodiment 1 identifies the position of the communication partner device by itself in parallel with communication by using the physical quantity (phase) of the communication radio wave without adding a sensor separately. The wireless communication device of Embodiment 1 checks the identified position against the map information to determine whether the communication partner device is an authorized device or an authorized device, thereby controlling access to the communication partner device.

When there are a plurality of communication partner devices, the wireless communication device of Embodiment 1 identifies the communication partner devices by using the physical quantity (phase) of the communication radio wave.

Embodiment 2

In Embodiment 2, differences from Embodiment 1 will be described.

In Embodiment 2, among the premises being set in Embodiment 1, "An unauthorized access point installed by an attacker spoofs an authorized access point by disguising the SSID but does not disguise the MAC address." is excluded, and a case where an unauthorized access point installed by an attacker spoofs an authorized access point by disguising both the MAC address and the SSID will be described.

In Embodiment 2, the position of the access point is estimated with a higher accuracy by using radio wave information of a plurality of communication frames.

When the unauthorized access points spoofs an authorized access point by disguising both the MAC address and the SSID, the access point cannot be distinguished by the MAC address, and it is difficult for the terminal device to detect spoofing from contents of the communication frames.

However, since a propagation path from the authorized access point to the terminal device and a propagation path from the unauthorized access point to the terminal device differ, radio wave information differs between the authorized access point and the unauthorized access point. As the MAC address of the authorized access point and the MAC address of the unauthorized access point are the same, a terminal device 100 distinguishes the authorized access point and the unauthorized access point from each other by clustering radio wave information.

This distinction is necessary when estimating the position of the access point with using the radio wave information of a plurality of communication frames, to distinguish which communication frame has been received from which access point. That is, if the MAC addresses are the same, which communication frame has been received from which access point cannot be distinguished. Therefore, which communication frame has been received from which access point is distinguished by the propagation path.

DESCRIPTION OF CONFIGURATION

Figure 12:
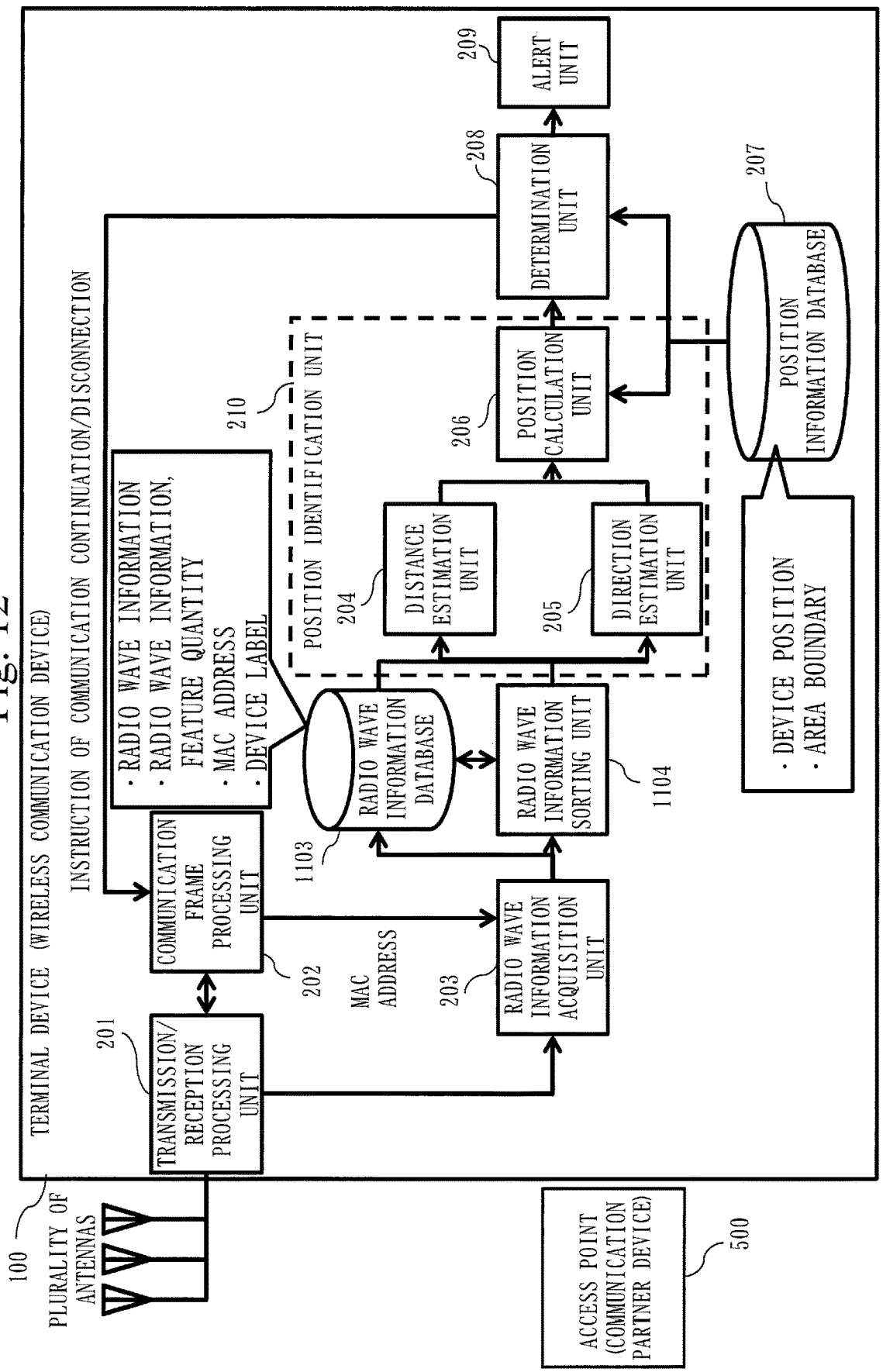
FIG. 12 is a configuration diagram of a terminal device 100 in Embodiment 2.

FIG. 12 illustrates a configuration of the terminal device 100 in Embodiment 2.

Two elements which are a radio wave information database 1103 and a radio wave information sorting unit 1104 are added to the configuration (FIG. 3) in Embodiment 1.

The radio wave information database 1103 holds radio wave information outputted from a radio wave information acquisition unit 203, a MAC address contained in a communication frame that served as a basis of the radio wave information, a feature quantity extracted by the radio wave information sorting unit 1104 from the radio wave information, and a device label obtained from a sorting result of the radio wave information sorting unit 1104. The reason of holding the MAC address is to enable a determination unit 208 to specify that communication with what access point is to be disconnected when the determination unit 208 sends a cut-off instruction to a communication frame processing unit 202.

The radio wave information sorting unit 1104 extracts the feature quantity from the radio wave information of the radio wave information database 1103, and performs clustering, to obtain the device label. Examples of the feature quantity may be as follows.
1. An amplitude distribution per frequency in frequency division multiplexing within the same communication frame
2. A phase distribution per frequency in frequency division multiplexing within the same communication frame
3. Values such as an amplitude and phase of a particular frequency in frequency division multiplexing within the same communication frame Further, as the terminal device 100 is provided with a plurality of antennas, differences between the feature quantities 1, 2, 3 mentioned above among the antennas may be considered. In clustering, a number of classes is not given in advance. Hence, to obtain the number of classes, an algorithm such as the G-means algorithm and the X-means algorithm, which determines the number of classes automatically is used.

DESCRIPTION OF OPERATIONS

Figure 13:
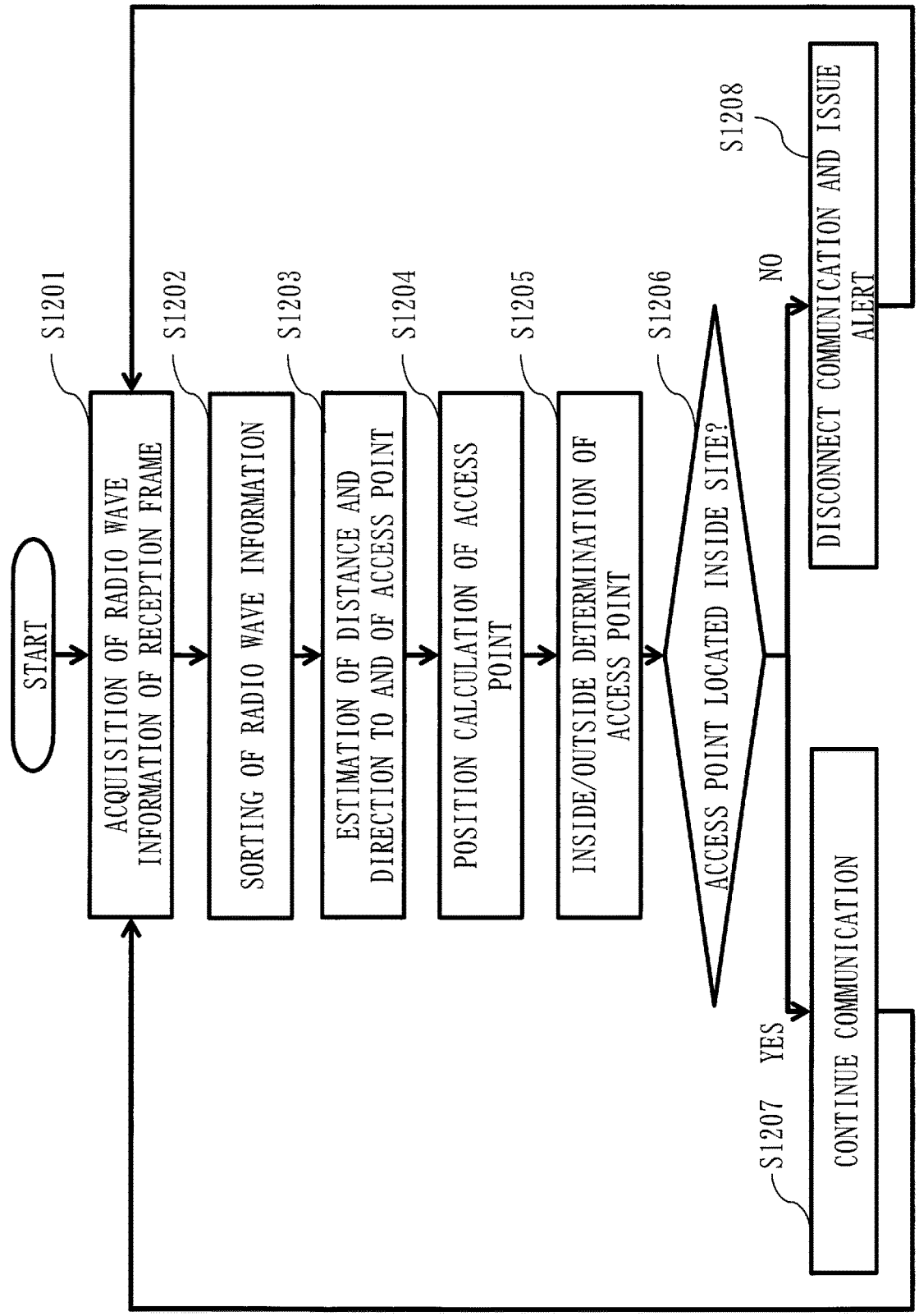
FIG. 13 is an operation flowchart of the terminal device 100 in Embodiment 2.

FIG. 13 is an operation flowchart of the terminal device 100 in Embodiment 2. Step S1202 for sorting the radio wave information is inserted in the operation flowchart (FIG. 5) of Embodiment 1.

Step S1202: Sorting of Radio Wave Information

The radio wave information sorting unit 1104 calculates a feature quantity of radio wave information newly stored in the radio wave information database 1103 by the radio wave information acquisition unit 203, and stores the feature quantity to the radio wave information database 1103. The radio wave information sorting unit 1104 applies a clustering algorithm, such as the G-means algorithm and the X-means algorithm, which determines the number of classes automatically to the feature quantity stored in the radio wave information database 1103. Since one class corresponds to one access point, the radio wave information sorting unit 1104 attaches device labels to the feature quantities of the individual classes and stores the labeled feature quantities to the radio wave information database 1103. If the feature quantities are the same or fall within a range of similarity, the radio wave information sorting unit 1104 attaches the same device label.

The radio wave information database 1103 associates the MAC address and the device label with each other and stores them. Even if the authorized access point and the unauthorized access point have the same MAC address, since feature quantities extracted from the radio wave information are different, the authorized access point and the unauthorized access point are associated with different device labels. A device label is an access point identifier corresponding to an access point, and is a propagation path identifier corresponding to a propagation path.

Once the device label is stored, sorting is completed. Hence, the radio wave information sorting unit 1104 accesses a distance estimation unit 204 and a direction estimation unit 205.

In step S1203 through step S1208, processes that are the same as in step S402 through step S407 of the operation flowchart (FIG. 5) in Embodiment 1 are performed, while the MAC address and the device label are kept associated with each other.

If the determination unit 208 determines in step S1206 that the position of the access point is inside the area, then in step S1207, the determination unit 208 continues communication of the MAC address associated with the device label.

If the determination unit 208 determines in step S1206 that the position of the access point is outside the area, then in step S1207, the determination unit 208 disconnects communication of the MAC address associated with the device label, and issues an alert.

Specifically, assume that the determination unit 208 receives, from the authorized access point and the unauthorized access point, communication frames whose MAC addresses are the same. If a device label is different, the access point is different. When it is determined that the position of the access point is outside the area, the determination unit 208 cuts off the propagation path with the access point associated with the device label, and issues an alert.

Effect in Embodiment 2

The radio wave information sorting unit 1104 determines a class corresponding to an access point by clustering the feature quantity of the radio wave information, and attaches a device label to correspond to the access point. Therefore, the access point can be identified from the device label.

Even in a case of an attack by an unauthorized access point that is a spoof disguising both the MAC address and the SSID, since the access point is identified by associating the MAC address and the device label with each other, the effect described in Embodiment 1 can be obtained.

The following are modifications of Embodiment 2. A plurality of modifications may be combined.

Modification 1

In Embodiment 2, there is a possibility that position estimation and inside/outside determination are performed over and over again about the same access point. In Modification 1, the communication frame processing unit 202 registers a device label determined by the determination unit 208 to be inside the area, with an authorization list, and holds the device label in the memory 103. The communication frame processing unit 202 checks in step S1202 whether the device label obtained from the feature quantity of the radio wave information of the access point coincides with the device label registered with the authorization list, and if they coincide, continues communication by skipping step S1203 and beyond. If the device label of the access point which is obtained from the feature quantity of the radio wave information does not coincide with the device label registered with the authorization list, the communication frame processing unit 202 performs step S1203 and beyond.

Also, the communication frame processing unit 202 registers the device label determined by the determination unit 208 to be outside the area, with a non-authorization list while the device label is kept associated with the MAC address, and holds the registered device label in the memory 103. The communication frame processing unit 202 checks in step S1202 whether the device label obtained from the feature quantity of the radio wave information of the access point coincides with the device label registered with the non-authorization list, and if they coincide, disconnects communication by using the MAC address registered with the un-authorization list, and issues an alert.

Modification 2

In Embodiment 2, the radio wave information database 1103 holds the radio wave information and its feature quantity. However, a holding capacity is limited.

Regarding this, in Modification 2, the radio wave information database 1103 may discard information that has been stored for a fixed period of time (for example, one hour). In particular, when combined with Modification 1 of Embodiment 2, estimation of a distance and direction is not performed for a device label of an access point determined to be inside the area. Thus, the radio wave information database 1103 may discard radio wave information associated with a device label of an access point determined to be inside the area, regardless of the time that has passed.

Modification 3

In Embodiment 2, the radio wave information sorting unit 1104 executes the clustering algorithm each time, such as the G-means algorithm and the X-means algorithm, which determines the number of classes automatically. However, with this algorithm, it is anticipated that a computation load will increase. In view of this, in Modification 3, a condition may be imposed that, for example, the radio wave information sorting unit 1104 practices the clustering algorithm once per every 1 hour, once per every 100 communication frames, or the like. The radio wave information sorting unit 1104 does not assign a device label to radio wave information that is newly stored while the clustering algorithm is not performed. Alternatively, the radio wave information sorting unit 1104 may assign a device label to radio wave information that is newly stored by adopting a sorting algorithm such as the k-nearest neighbor algorithm, with using clustered feature quantities of the radio wave information.

Characteristics of Embodiment 2

In Embodiment 2, attention is paid to the following.

$$\begin{aligned}\text{Difference in communication partner device} &= \text{difference in propagation path} \\ &= \text{difference in feature quantity of radio wave information} \\ &= \text{difference in class by clustering} \\ &= \text{difference in device label}\end{aligned}$$

The radio wave information sorting unit 1104 clusters a feature quantity of the radio wave information, determines a class corresponding to a communication partner device, attaches a device label to the communication partner device, and distinguishes the communication partner device by the device label.

Embodiment 3

In Embodiment 3, differences from Embodiments 1 and 2 will be described.

In Embodiment 3, among the premises being set in Embodiment 1, "The terminal device is provided with a plurality of antennas and conforms with multi-input multi-output (MIMO) communication." is excluded, and a case where the terminal device is provided with only one antenna will be described.

When the terminal device has only one antenna, although the distance can be estimated, the direction of the antenna is difficult to estimate, because phase differences among antennas cannot be acquired. In view of this, the terminal device is shifted and a distance to the access point is estimated at a plurality of positions, thereby estimating the direction to the access point. When the terminal device 100 is a smartphone or a tablet PC, it is easy to shift the terminal device 100. Implementation of an application program can be performed that instructs the user to rotate the arm in order to estimate the direction to the access point, just as a map guide application program instructs the user to move the terminal device along a FIG. 8 in order to adjust the compass.

DESCRIPTION OF CONFIGURATION

Figure 14:
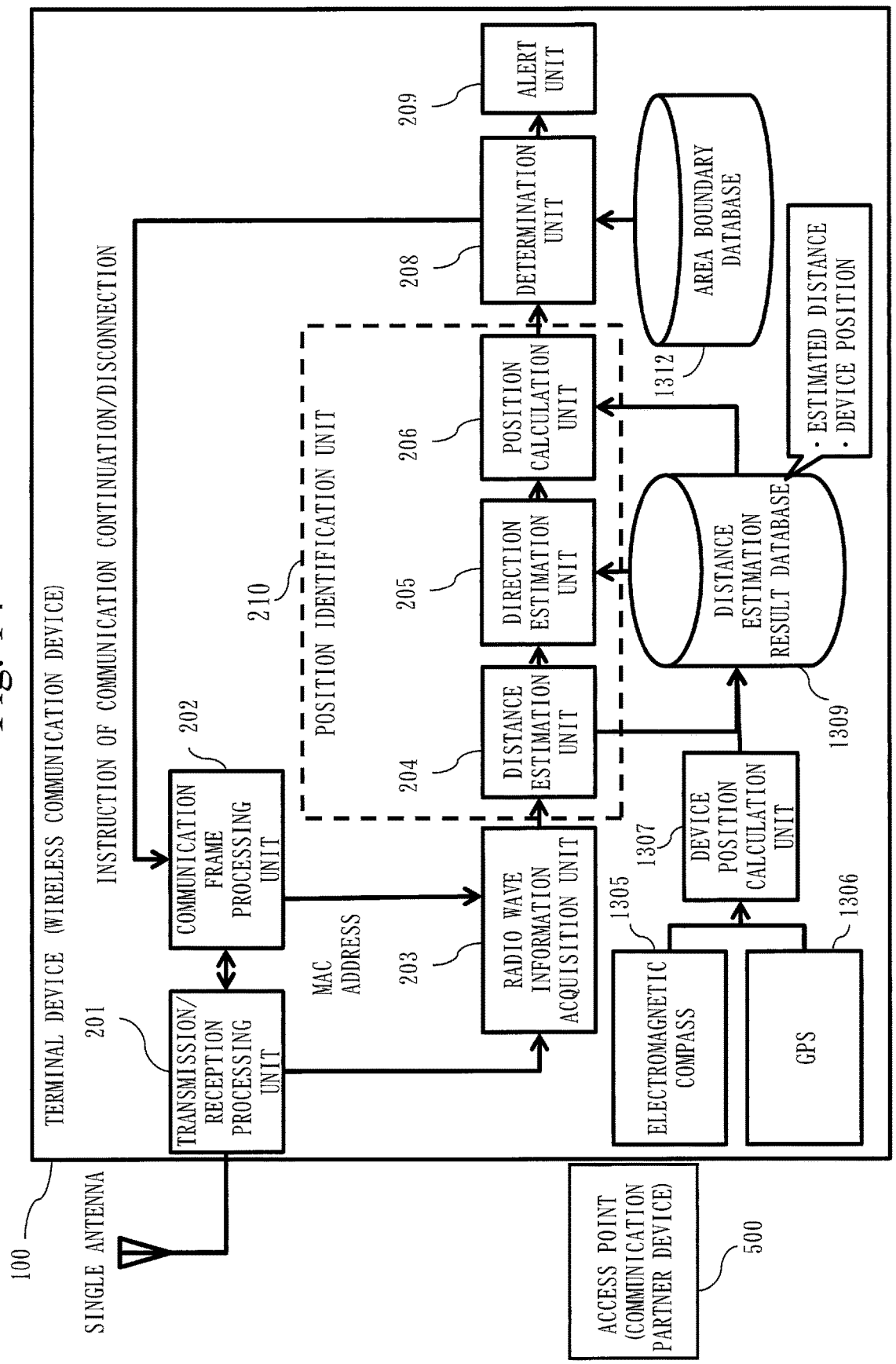
FIG. 14 is a configuration diagram of a terminal device 100 in Embodiment 3.

FIG. 14 illustrates a configuration of a terminal device 100 in Embodiment 3. The terminal device 100 is provided with a single antenna, a transmission/reception processing unit 201, a communication frame processing unit 202, a radio wave information acquisition unit 203, a distance estimation unit 204, an electromagnetic compass 1305, a GPS 1306, a device position calculation unit 1307, a direction estimation unit 205, a distance estimation result database 1309, a position calculation unit 206, a determination unit 208, an area boundary database 1312 in which an area boundary is stored, and an alert unit 209.

The distance estimation result database 1309 holds an estimated distance to an access point 500 which is outputted by the distance estimation unit 204, and a device position outputted by the device position calculation unit 1307, the estimated distance and the device position forming a set.

DESCRIPTION OF OPERATIONS

FIG. 15 is an operation flowchart of the terminal device 100 in Embodiment 3.

Step S1401: Shift of Terminal Device

The terminal device 100 is shifted in order to estimate a distance to the access point 500 at a plurality of different positions. As the shifting method, for example, if the terminal device 100 is a mobile terminal device, following methods are available: a method according to which the user holds the mobile terminal and shifts carrying the mobile terminal device; and a method according to which the mobile terminal device instructs the user to hold the mobile terminal device and to shift carrying the mobile terminal device. A method of shifting the terminal device 100 by mechanically deforming the terminal device 100 or the antenna itself is also possible.

Step S1402: Acquisition of Device Position

The device position calculation unit 1307 acquires a present position of the terminal device 100 from an output of the electromagnetic compass 1305 or the GPS 1306. The device position calculation unit 1307 outputs the present position of the terminal device 100 to the distance estimation result database 1309.

Step S1403: Acquisition of Radio Wave Information of Reception Frame

The single antenna of the terminal device 100 receives the radio wave from the access point 500. The transmission/reception processing unit 201 converts an analog signal which is the radio wave into a digital signal. The communication frame processing unit 202 takes the digital signal as a communication frame. During a process of converting the analog signal into digital information, the transmission/reception processing unit 201 sends the signal under processing (for example, a result of discrete Fourier transform of the radio wave) to the radio wave information acquisition unit 203.

Further, the communication frame processing unit 202 sends a MAC address of the access point 500 which is obtained from an acquired frame to the radio wave information acquisition unit 203.

At this time, the radio wave information may cover one communication frame, or a plurality of communication frames. With the radio wave information covering a plurality of communication frames, an accuracy in estimating the position of the access point 500 improves.

From step S1402 through step S1409, the transmission/reception processing unit 201 and the communication frame processing unit 202 may communicate with the access point 500, or may suspend communication with the access point 500 until step S1409 is ended.

The radio wave information acquisition unit 203 acquires radio wave information from the signal obtained from the transmission/reception processing unit 201. The radio wave information acquisition unit 203 associates the radio wave information with the MAC address obtained from the communication frame processing unit 202. The radio wave information acquisition unit 203 sends the radio wave information and the MAC address to the distance estimation unit 204.

Step S1404: Estimation of Distance to Access Point 500

The distance estimation unit 204 estimates a distance to the access point 500 from the radio wave information accepted from the radio wave information acquisition unit 203. As the estimation method, for example, a method is available which, by utilizing the fact that radio waves of different frequencies are transmitted simultaneously in IEEE 802.11 and Wi-Fi by frequency division multiplexing, estimates the distance from a phase difference of each frequency.

The distance estimation unit 204 outputs the estimated distance to the distance estimation result database 1309. The distance estimation result database 1309 associates the estimated distance with the device position accepted in step S1402 and holds them as a set {estimated distance, device position}.

Step S1405: Distance Estimated Regulated Number of Times?

It is determined whether there is a regulated number (for example, four) of sets {estimated distance, device position} in the distance estimation result database 1309. If YES, the processing proceeds to step S1406. If NO, the processing returns to step S1401, and another set {estimated distance, device position} is acquired.

Step S1406: Direction Estimation of Access Point 500

The direction estimation unit 205 estimates the direction of the access point 500 by referring to the set {estimated distance, device position} stored in the distance estimation result database 1309.

As the estimation method, for example, a method is available which assumes a plurality of circles each having as a center each device position and having as a radius an estimated distance from the device position, and which takes each intersecting portion where the plurality of circles intersect, as the position of the access point 500. The intersecting portion has a width that matches with resolution of distance estimation. At this time, the spacing between the device positions must be larger than the resolution of distance estimation.

Step S1407 through step S1411 are the same as step S403 through step S407 of the operation flowchart (FIG. 5) of Embodiment 1.

Effect in Embodiment 3

Even if the terminal device has only one antenna, the effect described in Embodiment 1 can be obtained by shifting the antenna and estimating at a plurality of positions the distance to the access point and the direction of the access point. Further, when compared with Embodiment 1, an effect of estimating a three-dimensional direction regardless of the disposition of the terminal device or the access point 500 and the antenna configuration can be achieved.

The following is a modification related to Embodiment 3.

Modification 1

In Embodiment 3, the direction estimation unit 205 estimates the direction of the access point 500 from distances from a plurality of points. As a more simplified direction estimation method, a method is available according to which the user holds a terminal device and performs scanning. Then, the direction estimation unit 205 determines a direction in which the highest reception intensity is obtained, as the direction of the access point 500.

Characteristics of Embodiment 3

The radio wave communication device of Embodiment 3 is provided with a single antenna. The direction estimation unit 205 finds the direction of the communication partner device with using distances to the communication partner device which are measured at a plurality of points (a plurality of device positions) with the single antenna.

The radio wave communication device of Embodiment 3 is provided with a single antenna. The direction estimation unit 205 finds the direction of the communication partner device with using reception radio wave intensities measured at a plurality of points (a plurality of positions) with the single antenna.

A plurality of embodiments have been described above. Among these embodiments, several ones may be implemented by combination. Alternatively, these embodiments may be implemented by partial combination.

REFERENCE SIGNS LIST

100: terminal device; 101: processor; 102: wireless communication interface; 103: memory; 104: storage; 201: transmission/reception processing unit; 202: communication frame processing unit; 203: radio wave information acquisition unit; 204: distance estimation unit; 205: direction estimation unit; 206: position calculation unit; 207: position information database; 208: determination unit; 209: alert unit; 210: position identification unit; 211: positional relationship determination unit; 500: access point; 1305: electromagnetic compass; 1306: GPS; 1307: device position calculation unit; 1103: radio wave information database; 1104: radio wave information sorting unit; 1312: area boundary database; 1309: distance estimation result database.

The invention claimed is:

1. A wireless communication device comprising:
a position information database in which map information is stored; and
processing circuitry
to extract a physical quantity of a communication radio wave received from a communication partner device,
to identify a position of the communication partner device on a basis of the acquired physical quantity, and
to collate the identified position of the communication partner device with the map information stored in the position information database, and to determine whether the communication partner device is an authorized device or an unauthorized device,
wherein the position information database stores a device position of the wireless communication device, as the map information, and
wherein the processing circuitry
extracts a phase of the communication radio wave, as the physical quantity,
estimates a distance to the communication partner device on a basis of the phase of the communication radio wave,
estimates a direction where the communication partner device exists on a basis of the phase of the communication radio wave, and
calculates the position of the communication partner device on a basis of the device position, the distance, and the direction.

2. The wireless communication device according to claim 1, comprising a plurality of antennas, wherein the processing circuitry finds the direction of the communication partner device with using phases obtained from the plurality of antennas.

3. The wireless communication device according to claim 1, comprising a single antenna, wherein the processing circuitry finds the direction of the communication partner device with using distances to the communication partner device which are measured at a plurality of points with the single antenna.

4. The wireless communication device according to claim 1, comprising a single antenna, wherein the processing circuitry finds the direction of the communication partner device with using reception radio wave intensities measured at a plurality of points with the single antenna.

5. The wireless communication device according to claim 1, wherein the processing circuitry updates the device position of the wireless communication device which is stored in the position information database.

6. The wireless communication device according to claim 1, wherein the processing circuitry registers, with an authorization list, a communication partner device determined as being an authorized device, and causes the communication partner device registered with the authorization list to continue communication.

7. The wireless communication device according to claim 1, wherein the processing circuitry calculates the position of the wireless communication device backwards from positions of a plurality of communication partner devices, and determines a position of a candidate for an unauthorized communication partner device on a basis of a backward calculation result.

8. The wireless communication device according to claim 1,
wherein the processing circuitry
calculates a feature quantity of radio wave information, and
determines a class corresponding to the communication partner device by clustering the feature quantity, and attaches a device label to the communication partner device.

9. The wireless communication device according to claim 1,
wherein the position information database stores an area boundary of an area where the communication partner device should exist, as the map information, and
wherein the processing circuitry collates the position of the communication partner device with the area boundary, and determines whether the communication partner device is an authorized device or an unauthorized device.

10. The wireless communication device according to claim 1, which, when there are a plurality of communication partner devices, identifies the communication partner devices by using the physical quantity.

11. A wireless communication method comprising:
extracting a physical quantity of a communication radio wave received from a communication partner device;
identifying a position of the communication partner device on a basis of the physical quantity; and
collating the position of the communication partner device with map information stored in a position information database, and determining whether the communication partner device is an authorized device or an unauthorized device,
wherein the position information database stores a device position of a wireless communication device, as the map information,
the wireless communication method comprising:
extracting a phase of the communication radio wave, as the physical quantity; and
when identifying the position of the communication partner device,
estimating a distance to the communication partner device on a basis of the phase of the communication radio wave, estimating a direction where the communication partner device exists on a basis of the phase of the communication radio wave, and calculating the position of the communication partner device on a basis of the device position, the distance, and the direction.

12. A non-transitory computer readable medium storing a program that causes a computer having a position information database in which a device position of a wireless communication device is stored as map information, to execute:

- a radio wave information acquisition process of extracting a physical quantity of a communication radio wave received from a communication partner device;
- a position identification process of identifying a position of the communication partner device on a basis of the physical quantity acquired by the radio wave information acquisition process; and
- a determination process of collating the position of the communication partner device which is identified by the position identification process, with the map information stored in the position information database, and determining whether the communication partner device is an authorized device or an unauthorized device, wherein the radio wave information acquisition process includes extracting a phase of the communication radio wave, as the physical quantity; and wherein the position identification process includes estimating a distance to the communication partner device on a basis of the phase of the communication radio wave, estimating a direction where the communication partner device exists on a basis of the phase of the communication radio wave, and calculating the position of the communication partner device on a basis of the device position, the distance, and the direction.

* * * * *